(12) United States Patent
Toomey

(10) Patent No.: US 7,730,137 B1
(45) Date of Patent: Jun. 1, 2010

(54) RESTRICTING THE VOLUME OF OUTBOUND ELECTRONIC MESSAGES ORIGINATED BY A SINGLE ENTITY

(75) Inventor: Christopher Toomey, Cupertino, CA (US)

(73) Assignee: AOL Inc., Dulles, VA (US)

( * ) Notice: Subject to any disclaimer, the term of this patent is extended or adjusted under 35 U.S.C. 154(b) by 1319 days.

(21) Appl. No.: 10/740,820

(22) Filed: Dec. 22, 2003

(51) Int. Cl.
G06F 15/16 (2006.01)
(52) U.S. Cl. .............. 709/206; 713/153; 713/176; 713/185
(58) Field of Classification Search .......... 709/206, 709/207, 225, 227; 713/168, 185, 176, 188, 713/153, 179; 726/2, 8; 358/1.15
See application file for complete search history.

(56) References Cited

U.S. PATENT DOCUMENTS

| | | |
|---|---|---|
| 5,475,839 A | 12/1995 | Watson et al. |
| 5,546,390 A | 8/1996 | Stone |
| 5,548,533 A | 8/1996 | Gao et al. |
| 5,577,197 A | 11/1996 | Beck |
| 5,606,668 A | 2/1997 | Shwed |
| 5,619,648 A | 4/1997 | Canale et al. |
| 5,634,040 A | 5/1997 | Her et al. |
| 5,699,514 A | 12/1997 | Durinovic-Johri et al. |
| 5,704,047 A | 12/1997 | Schneeberger |
| 5,732,212 A | 3/1998 | Perholtz et al. |
| 5,742,587 A | 4/1998 | Zornig et al. |
| 5,805,810 A | 9/1998 | Maxwell |
| 5,825,861 A | 10/1998 | Hoy |
| 5,857,188 A | 1/1999 | Douglas |
| 5,862,325 A | 1/1999 | Reed et al. |
| 5,884,246 A | 3/1999 | Boucher et al. |
| 5,923,848 A | 7/1999 | Goodhand et al. |
| 5,999,932 A | 12/1999 | Paul |
| 5,999,967 A * | 12/1999 | Sundsted .................. 709/206 |

(Continued)

FOREIGN PATENT DOCUMENTS

| | | |
|---|---|---|
| EP | 0889668 | 1/1999 |
| WO | WO 99/03238 | 1/1999 |
| WO | WO 99/33188 | 7/1999 |
| WO | WO 02/19661 | 3/2002 |

OTHER PUBLICATIONS

Neuman, B.C., and Ts'o, T., "Kerberos: An Authentication Service for Computer Networks," *IEEE Communications Magazine*, vol. 32, No. 9, pp. 33-38, Sep. 1994.

(Continued)

*Primary Examiner*—Dustin Nguyen
(74) *Attorney, Agent, or Firm*—Fish & Richardson P.C.

(57) ABSTRACT

The volume of outgoing electronic messages from a given entity may be restricted by preventing the messages, such as spam, from being sent. Messages may be restricted, for example, by serializing outgoing messages using a mutual-exclusion locking technique or by using a ticket-based system. Serialization may occur, for example, at a web level in web-based implementations. In one system, a limited-use ticket is generated that allows an entity to send one or more electronic messages, and the ticket is provided to the entity. A request is received from the entity to send an electronic message, and the request is associated with the ticket and the electronic message. After receiving the request, a determination is made as to whether the ticket is valid and, if the ticket is determined to be valid, the electronic message is approved for sending.

33 Claims, 11 Drawing Sheets

U.S. PATENT DOCUMENTS

| | | | |
|---|---|---|---|
| 6,018,619 | A | 1/2000 | Allard et al. |
| 6,044,260 | A | 3/2000 | Eaton et al. |
| 6,052,709 | A | 4/2000 | Paul |
| 6,072,942 | A | 6/2000 | Stockwell et al. |
| 6,088,736 | A | 7/2000 | Manning et al. |
| 6,092,115 | A | 7/2000 | Choudhury et al. |
| 6,105,012 | A | 8/2000 | Chang et al. |
| 6,161,130 | A | 12/2000 | Horvitz et al. |
| 6,167,029 | A | 12/2000 | Ramakrishnan |
| 6,167,434 | A | 12/2000 | Pang |
| 6,182,226 | B1 | 1/2001 | Reid et al. |
| 6,199,103 | B1 | 3/2001 | Sakaguchi et al. |
| 6,205,551 | B1 | 3/2001 | Grosse |
| 6,212,184 | B1 | 4/2001 | Venkatachary et al. |
| 6,219,694 | B1 | 4/2001 | Lazaridis et al. |
| 6,219,706 | B1 | 4/2001 | Fan et al. |
| 6,219,786 | B1 | 4/2001 | Cunningham et al. |
| 6,237,027 | B1 | 5/2001 | Namekawa |
| 6,266,664 | B1 | 7/2001 | Russell-Falla et al. |
| 6,266,692 | B1 | 7/2001 | Greenstein |
| 6,286,049 | B1 | 9/2001 | Rajakarunanayake et al. |
| 6,321,267 | B1 | 11/2001 | Donaldson |
| 6,330,590 | B1 | 12/2001 | Cotton |
| 6,336,133 | B1 | 1/2002 | Morris et al. |
| 6,339,784 | B1 | 1/2002 | Morris et al. |
| 6,351,764 | B1 | 2/2002 | Voticky et al. |
| 6,351,794 | B1 | 2/2002 | Spilo et al. |
| 6,360,254 | B1 | 3/2002 | Linden et al. |
| 6,363,479 | B1 | 3/2002 | Godfrey et al. |
| 6,418,420 | B1 | 7/2002 | DiGiorgio et al. |
| 6,421,709 | B1 | 7/2002 | McCormick et al. |
| 6,430,619 | B1 | 8/2002 | Sitaraman et al. |
| 6,453,327 | B1 | 9/2002 | Nielsen |
| 6,484,197 | B1 * | 11/2002 | Donohue ................ 709/206 |
| 6,493,007 | B1 | 12/2002 | Pang |
| 6,507,866 | B1 | 1/2003 | Barchi |
| 6,529,955 | B1 | 3/2003 | Sitaraman et al. |
| 6,535,517 | B1 | 3/2003 | Arkko et al. |
| 6,542,583 | B1 | 4/2003 | Taylor |
| 6,580,790 | B1 | 6/2003 | Henry et al. |
| 6,591,291 | B1 | 7/2003 | Gabber et al. |
| 6,591,301 | B1 | 7/2003 | Li et al. |
| 6,615,241 | B1 | 9/2003 | Miller et al. |
| 6,636,894 | B1 | 10/2003 | Short et al. |
| 6,643,685 | B1 | 11/2003 | Millard |
| 6,643,686 | B1 | 11/2003 | Hall |
| 6,654,373 | B1 | 11/2003 | Maher, III et al. |
| 6,654,787 | B1 | 11/2003 | Aronson et al. |
| 6,662,230 | B1 | 12/2003 | Eichstaedt et al. |
| 6,678,835 | B1 | 1/2004 | Shah et al. |
| 6,691,156 | B1 | 2/2004 | Drummond et al. |
| 6,701,522 | B1 | 3/2004 | Rubin et al. |
| 6,732,149 | B1 * | 5/2004 | Kephart .................. 709/206 |
| 6,738,814 | B1 | 5/2004 | Cox et al. |
| 6,742,123 | B1 | 5/2004 | Foote |
| 6,748,422 | B2 | 6/2004 | Morin et al. |
| 6,751,668 | B1 | 6/2004 | Lin et al. |
| 6,763,467 | B1 | 7/2004 | Radatti et al. |
| 6,772,334 | B1 | 8/2004 | Glawitsch |
| 6,778,498 | B2 | 8/2004 | McDyson |
| 6,820,202 | B1 * | 11/2004 | Wheeler et al. ............. 713/185 |
| 6,829,635 | B1 | 12/2004 | Townshend |
| 6,829,772 | B2 | 12/2004 | Foote et al. |
| 6,834,310 | B2 | 12/2004 | Munger et al. |
| 6,839,759 | B2 | 1/2005 | Larson et al. |
| 6,868,436 | B1 | 3/2005 | Fleming, III |
| 6,868,498 | B1 | 3/2005 | Katsikas |
| 6,898,711 | B1 * | 5/2005 | Bauman et al. ............. 713/185 |
| 6,928,465 | B2 | 8/2005 | Earnest |
| 7,032,023 | B1 | 4/2006 | Barrett et al. |
| 7,072,943 | B2 * | 7/2006 | Landesmann ................ 709/206 |
| 7,089,585 | B1 * | 8/2006 | Dharmarajan .................. 726/8 |
| 7,103,599 | B2 | 9/2006 | Buford |
| 7,120,927 | B1 * | 10/2006 | Beyda et al. .................... 726/2 |
| 7,149,801 | B2 * | 12/2006 | Burrows et al. ............. 709/225 |
| 7,155,608 | B1 | 12/2006 | Malik et al. |
| 7,188,358 | B1 * | 3/2007 | Hisada et al. .................. 726/2 |
| 7,293,063 | B1 | 11/2007 | Sobel |
| 7,321,922 | B2 * | 1/2008 | Zheng et al. ................ 709/206 |
| 7,380,126 | B2 * | 5/2008 | Logan et al. ................ 713/176 |
| 7,395,314 | B2 * | 7/2008 | Smith et al. ................ 709/206 |
| 7,398,315 | B2 * | 7/2008 | Atkinson et al. ............ 709/227 |
| 7,548,956 | B1 | 6/2009 | Aoki et al. |
| 2002/0059454 | A1 | 5/2002 | Barrett |
| 2002/0103916 | A1 | 8/2002 | Chen et al. |
| 2002/0107953 | A1 | 8/2002 | Ontiveros et al. |
| 2002/0108059 | A1 | 8/2002 | Canion et al. |
| 2002/0116463 | A1 | 8/2002 | Hart |
| 2002/0116641 | A1 | 8/2002 | Mastrianni |
| 2002/0169954 | A1 * | 11/2002 | Bandini et al. .............. 713/153 |
| 2002/0178187 | A1 | 11/2002 | Rasmussen et al. |
| 2002/0181703 | A1 | 12/2002 | Logan et al. |
| 2002/0199095 | A1 | 12/2002 | Bandini et al. |
| 2003/0033545 | A1 | 2/2003 | Wenisch et al. |
| 2003/0145232 | A1 | 7/2003 | Poletto et al. |
| 2003/0163691 | A1 * | 8/2003 | Johnson ...................... 713/168 |
| 2003/0167402 | A1 | 9/2003 | Stolfo et al. |
| 2003/0172269 | A1 * | 9/2003 | Newcombe .................. 713/168 |
| 2003/0200267 | A1 * | 10/2003 | Garrigues ................... 709/206 |
| 2003/0220978 | A1 * | 11/2003 | Rhodes ....................... 709/206 |
| 2003/0236847 | A1 * | 12/2003 | Benowitz et al. ............ 709/206 |
| 2004/0015554 | A1 | 1/2004 | Wilson |
| 2004/0064515 | A1 | 4/2004 | Hockey |
| 2004/0083270 | A1 | 4/2004 | Heckerman et al. |
| 2004/0093384 | A1 | 5/2004 | Shipp |
| 2004/0122803 | A1 | 6/2004 | Dom et al. |
| 2004/0145773 | A1 * | 7/2004 | Oakeson et al. ............. 358/1.15 |
| 2004/0205135 | A1 | 10/2004 | Hallam-Baker |
| 2004/0215772 | A1 * | 10/2004 | Dinker et al. ................ 709/225 |
| 2004/0260778 | A1 | 12/2004 | Banister et al. |
| 2004/0267625 | A1 | 12/2004 | Feng et al. |
| 2005/0021649 | A1 * | 1/2005 | Goodman et al. ........... 709/207 |
| 2005/0033810 | A1 | 2/2005 | Malcolm |
| 2005/0055404 | A1 | 3/2005 | Kitchen |
| 2005/0091319 | A1 | 4/2005 | Kirsch |
| 2005/0102526 | A1 * | 5/2005 | Davey et al. ................ 713/188 |
| 2005/0114452 | A1 | 5/2005 | Prakash |
| 2005/0120019 | A1 | 6/2005 | Rigoutsos et al. |
| 2005/0125667 | A1 * | 6/2005 | Sullivan et al. ............. 713/170 |
| 2005/0132060 | A1 * | 6/2005 | Mo et al. ..................... 709/227 |
| 2006/0136590 | A1 | 6/2006 | Barrett et al. |

OTHER PUBLICATIONS

"Mutual Exclusion Within a Single Processor Linux Kernel," reprinted from http://parallel.rz.uni-mannheim.de/Linux/smp/node23.html on Apr. 17, 2003, 2 pages.

"Read-Copy Update Mutual Exclusion," reprinted from http://lse.sourceforge.net/locking.rcupdate.html on Apr. 17, 2003, 4 pages.

Office Action issued in U.S. Appl. No. 10/747,264 mailed May 29, 2008, 29 pages.

A. Kolcz and J. Alspector, "SVM-based Filtering of E-mail Spam with Content-specific Misclassification Costs," TextDM'2001 (IEEE ICDM-2001 Workshop on Text Mining), San Jose, CA, 2001.

*Allowing controlled SMTP relaying in Sendmail 8.9*, (2 pages), Oct. 30, 2001 http://web.archice.org/web/20000510213022/www.sendmail.org/tips/relaying.html.

*Anti-Spam Configuration Control*, (5 pages), Nov. 1998 http://web.archice.org/web/20000520064211/www.sendmail.org/m4/anti-spam.html.

*Anti-Spam Provisions in Sendmail 8.8*, (4 pages), Jan. 30, 2000 http://web.archice.org/web/20000510040556/www.sendmail.org/m4/antispam.html.

Bart Massey et al.; "Learning Spam: Simple Techniques for Freely-Available Software", Computer Science Dept., Portland, or USA, 2003, pp. 1-14.

Dale Woolridge et al., "qmail-spamthrottle (5) — the spam throttle mechanism", http:///.spamthrottle,qmail.ca/man/qmail-spamthrottle.5.html, pp. 1-4.

Eric Allman, *SENDMAIL ™ Installation and Operation Guide Version 8.310 for Sendmail Version 8.10*, Sendmail, Inc., (84 pages).

Godfrey, J., "Instant Spam: It's Tough to Swallow," *Home Office Computing*, [online] vol. 16, No. 11, p. 24 [retrieved on Dec. 29, 2004]. Retrieved from <URL: http://proquest.umi.com/pdqweb?index=21&sid=2&srchmode=1&vinst=PROD&fmt=4&startpage...>.

H. Drucker et al., "Support Vector Machines for Spam Categorization", IEEE Transactions on Neural Networks, vol. 10, No. 5, Sep. 1999.

H. Zaragoza et al., "Learning to Filter Spam E-Mail: A Comparison of a Naïve Bayesian and a Memory-Based Approach," $4^{th}$ European Conference on Principles and Practice of Knowledge Discovery in Databases (PKDD-2000), Lyon, France, Sep. 2000, pp. 1-12.

http://www.palimine.net/qmail/tarpit.html, "Tarpitting with qmail-smtpd", p. 1 Jul. 2, 2003.

http://www.paulgraham.com/better.html, "Better Bayesian Filtering", Jan. 2003 pp. 1-11.

J. Dudley, "Telstra targets Net spammers", news.com.au, Dec. 2, 2003.

M. Hearst et al., "Support Vector Machines", IEEE Intelligent Systems, Jul./Aug. 1998.

M. Marvin, "Announce: Implementation of E-mail Spam Proposal", news.admin.net-abuse.misc, Aug. 3, 1996.

Mark Durham, *Spam Control in 8.10*, (3 pages), Feb. 4, 2000 http://web.archive.org/web/20000618042433/sendmail.net/?feed=interview810-5.

Office Action issued in U.S. Appl. No. 10/746,231 mailed Apr. 9, 2008, 29 pages.

Office Action issued in U.S. Appl. No. 10/747,264 mailed Jan. 28, 2008, 18 pages.

Office Action issued in U.S. Appl. No. 10/747,264 mailed May 29, 2008, 29 pages.

Office Action issued in U.S. Appl. No. 11/330,340 mailed Mar. 8, 2007, 18 pages.

Office Action issued in U.S. Appl. No. 11/330,340 mailed Sep. 14, 2006, 20 pages.

Office Action issued in U.S. Appl. No. 10/746,231 dated Sep. 29, 2008, 61 pages.

Paul Boutin, *RFC 2476: Message Submission Agent*, (3 pages), Feb. 24, 2000 http://web.archive.org/web/200010270602105/sendmail.net/?feed=rfc2476.

Paul Boutin, *RFC 2554: SMTP Authentication*, (4 pages), Feb. 22, 2000 http://web.archive.org/web/20001016141928/sendmail.net/?feed=rfc2554.

R. Hall, "A Countermeasure to Duplicate-detecting Anti-spam Techniques", AT&T Labs Technical Report 99.9.1, 1999.

*Relaying Denied/Allowed (in sendmail 8.8/8.9)*, Last Update Feb. 11, 2000, (2 pages), http://web.archive.org/web/20000418000700/www.sendmail.org/~ca/email/relayingdenied...,.

rfc2222, J. Myers, *Simple Authentication and Security Layer (SASL)*, (16 pages), Oct. 1997, The Internet Society (1997), http://web.archive.org/web/20001027153713/www.cis.ohio-state.edu/htbin/rfc/rfc2222.ht...,.

rfc2554, J. Myers, *SMTP Service Extension for Authentication*, (11 pages), Mar. 1999, The Internet Society (1999), http://web.archive.org/web/20001018181229/www. cis.ohio-state.edu/htbin/rfc/rfc2554.ht...,.

S. Hird, "Technical Solutions for Controlling Spam in the proceedings of AUUG2002", Melbourne, Sep. 4-6, 2002.

T. Joachims, Text Categorization with Support Vector Machines: Learning with Many Relevant Features, University of Dortmund, Computer Science Dept., LS-8 Report 23, 1998. Apr. 19, 1998.

U.S. Appl. No. 09/749,593.

*Using SMTP AUTH in Sendmail 8.10*, (2 pages), Mar. 27, 2000, http://web.archive.org/web/20001016174022/sendmail.net/?feed=usingsmthpauth.

* cited by examiner

RESTRICTING THE VOLUME OF OUTBOUND ELECTRONIC MESSAGES ORIGINATED BY A SINGLE ENTITY

TECHNICAL FIELD

The technical field relates to sending electronic messages, and more particularly, to restricting the volume of outgoing electronic messages from a given user.

BACKGROUND

Some electronic messages tend to increase communication and facilitate a number of beneficial and desirable goals. However, other electronic messages are not desired by the recipients and, accordingly, unnecessarily consume both the time of the recipients and the resources of computer networks. The undesired electronic messages are frequently referred to as "spam."

SUMMARY

Techniques are described that may be used, for example, to limit spam, and these techniques may restrict the volume of outgoing messages from a given user. Such restriction prevents the messages from being sent, rather than merely preventing the messages from being received by a recipient or from being stored in a recipient's inbox. The volume of outgoing messages may be restricted by, for example, serializing the approval of messages for sending and or by using a ticket-based system.

Several techniques use a ticket-based system and issue a single-use ticket to a user that wants to send a message. The user is required to include the issued ticket in a message-send request, and the system sends the message only if, for example, the included ticket has not already been used. A new ticket may be generated, for example, only after the current ticket is used or has expired, and/or upon request.

In one implementation, only one ticket is current at a given time, and the ticket can only be used once. As a result, a user cannot successfully send multiple message-send requests in parallel. Rather, after sending a message-send request, the user must wait for a new ticket before sending a subsequent message-send request. Such ticket-based techniques may preclude or hinder a user from, for example, (i) logging-in to an electronic mail system multiple times under a common name or ID, (ii) establishing multiple concurrent electronic mail sessions, and (iii) sending electronic mail concurrently from each of the multiple sessions. Such techniques also may preclude or hinder a user from, for example, sending multiple electronic mail messages too frequently from within a single electronic mail session.

Several techniques of serializing outgoing messages use a modified mutual exclusion locking technique to serialize multiple requests from a given user. The requests that are serialized may include, for example, a request to send an electronic message, a request to verify a ticket, or a request to issue a ticket.

According to one aspect, approving an electronic message for sending includes generating a ticket that is useful in regulating an ability of a particular entity to send one or more electronic messages. The ticket is made available to the entity. A request from the entity to send an electronic message is evaluated, the request being associated with the ticket and the electronic message. After evaluating the request, it is determined whether the ticket is valid. If the ticket is determined to be valid, the electronic message is approved for sending.

A time stamp may be stored, the time stamp being of an electronic message that was most recently sent for the entity. Generating the ticket may involve including in the ticket the time stamp as it is stored when the ticket is generated. Determining whether the ticket is valid may include comparing the included time stamp from the ticket to the time stamp as it is stored when the ticket's validity is determined.

The ticket may allow the entity to send only one electronic message, and determining whether the ticket is valid may include determining whether the ticket has been used by the entity. A second request from the entity may be evaluated, the second request being to send a second electronic message and being associated with the ticket and the second electronic message. After evaluating the second request, it may be determined whether the ticket is valid. At least one of the electronic message and the second electronic message may be declined for approval for sending.

A new ticket may be generated, and generating the new ticket may render the ticket invalid.

A second request from the entity may be received, the second request being to send a second electronic message and being associated with a second ticket and the second electronic message. After receiving the second request, it may be determined whether the second ticket is valid. If the second ticket is determined to be valid, the second electronic message may be approved for sending. The second request may be received before determining whether the ticket is valid, and determining whether the ticket is valid and determining whether the second ticket is valid may be performed serially. Performing the determinations serially may include locking a resource while determining whether the ticket is valid and while determining whether the second ticket is valid.

The request may be received from the entity, and receiving the request may include receiving the request over a first session. Receiving the second request may include receiving the second request over a second session, the second session being active concurrently with the first session.

The request may be received from the entity, and the first request and the second request may be received at a web-based server. If the ticket is determined to be valid, approving the electronic message for sending may be performed at the web-based server. If the second ticket is determined to be valid, approving the second electronic message for sending may be performed at the web-based server.

Determining whether the second ticket is valid may be performed after determining whether the ticket is valid by, for example, waiting until after determining whether the ticket is valid. Determining serially whether the ticket and the second ticket are valid may result in restricting an outbound volume of electronic messages for the entity.

The first request may be received at a first server that is in communication with a common server. The ticket may be sent from the first server to the common server, and determining whether the ticket is valid may be performed at the common server. A second request may be received from the entity at a second server that is in communication with the common server, the second request being to send a second electronic message and being associated with a second ticket and the second electronic message. The second ticket may be sent from the second server to the common server. It may determined at the common server whether the second ticket is valid.

Determining whether the ticket is valid may include determining that the ticket is not valid. Based on determining that the ticket is not valid, at least one additional electronic message from the entity may be declined for approval for sending, the additional electronic message being associated with an additional request.

The first request may be received at a router. A second request may be received at the router from the entity, the second request being to send a second electronic message and being associated with a second ticket and the second electronic message. A common server may be determined at the router, the common server being mapped to the entity and being in communication with the router. The first request and the second request may be sent to the common server. It may be determined at the common server whether the second ticket is valid, and determining whether the ticket is valid also may be performed at the common server.

The entity may include multiple users and/or multiple computers.

The electronic message may be sent, and a rate-limiting algorithm may be applied to the entity before sending the electronic message. After sending a previous electronic message for the entity, at least a predetermined period of time may elapse, by, for example, waiting, before sending the electronic message. The ticket may include an indicator of when the previous electronic message was sent, and waiting at least the predetermined period of time may include using the indicator to determine whether the predetermined period of time has elapsed. After sending the electronic message, at least a predetermined period of time may elapse, by, for example, waiting, before issuing a second ticket to the entity.

A system for approving an electronic message for sending may include a memory device and one or more processors coupled to the memory device. The one or more processors may be collectively programmed to perform one or more of the operations described above with respect to this aspect.

The system may include a web-based server including at least a first processor from among the one or more processors and the web-based server may be programmed to evaluate the request from the entity to send the electronic message. The system may include a ticket server that is communicatively coupled to the web-based server. The ticket server may include at least a second processor from among the one or more processors and the ticket server may be programmed to determine whether the ticket is valid. The web-based server may be further programmed to communicate the request, and all requests from the entity, to the ticket server. The ticket server may be further programmed to receive the request, and all requests from the entity, communicated from the web-based server, and to determine serially, for the request and all requests from the entity, whether the associated ticket is valid.

The system may include a router which may include at least a first processor from among the one or more processors. The router may be programmed to evaluate the request from the entity to send the electronic message. The system may include a web-based server communicatively coupled to the router and including at least a second processor from among the one or more processors. The web-based server may be programmed to determine whether the ticket is valid. The router may be further programmed to map the request, and all requests from the entity, to the web-based server, and to communicate the request, and all requests from the entity, to the web-based server. The web-based server may be further programmed to receive the request, and all requests from the entity, communicated from the router, and to determine serially, for the request and all requests from the entity, whether the associated ticket is valid.

According to another aspect, evaluating a request to send an electronic message includes receiving at a router a request from an entity to send an electronic message. The request is sent from the router to a server. The request is received at the server from the router. A lock is acquired for the entity at the server. The request is evaluated at the server after acquiring the lock. The lock is released after evaluating the request.

A second request from the entity may be received at the router, the second request being to send a second electronic message. The second request may be sent from the router to the server. The second request may be received at the server from the router, the second request being received after acquiring the lock. A second lock may be acquired after the lock is released by, for example, waiting until the lock is released before acquiring the second lock. The second request may be evaluated at the server after acquiring the second lock. The second lock may be released after evaluating the second request.

It may be determined that the request is valid, and after determining that the request is valid, the electronic message may be sent to an intended recipient. The entity may be mapped to the server, and the map may be used to send to the server requests from the entity received at the router.

According to another aspect, sending electronic messages includes providing multiple tickets for an entity, each ticket allowing at least one message to be sent. Multiple message-send requests from the entity are received at a web-based server, each message-send request being associated with an electronic message for sending and with a ticket from among the provided tickets. For each message-send request, it is determined whether the associated ticket is valid. For each message-send request having an associated ticket that has been determined to be valid, sending of the electronic message associated with the message-send request is approved, and the approving is performed at the web-based server. Each electronic message whose sending was approved is sent.

Determining whether each of the multiple associated tickets is valid may be performed serially. Each ticket may allow, for example, at most a single electronic message to be sent.

For each message-send request having an associated ticket that is determined to be not valid, the electronic message associated with the message-send request may be declined for sending, or the sending may be delayed.

Determining whether the associated ticket is valid may be performed at least in part at the web-based server.

According to another aspect, approving electronic messages for sending includes receiving a first request, at an electronic message system, to send a first electronic message. A second request is received at the electronic message system, the second request being to send a second electronic message and being received before the first electronic message is sent. It is determined whether to approve the first electronic message for sending. After waiting, until after determining whether to approve the first electronic message for sending, it is determined whether to approve the second electronic message for sending.

According to another aspect, interacting with an electronic message system includes receiving a first ticket, from an electronic message system, for sending an electronic message. A first electronic message, associated with the first ticket, is sent to the electronic message system. A second electronic message, associated with the first ticket, is sent to the electronic message system. At least one of the first and second electronic messages is rejected by the electronic message system for failure to be associated with a valid ticket.

Sending the first electronic message may include sending the first electronic message over a first session with the electronic message system. Sending the second electronic message may include sending the second electronic message over a second session with the electronic message system.

According to any of the above-mentioned aspects, a system or apparatus may include a memory device and one or more processors coupled to the memory device, the one or more processors collectively programmed to perform one or more of the operations described with respect to that aspect.

According to any of the above-mentioned aspects, a system or apparatus may include one or more computer readable media having instructions stored thereon that when executed by one or more machines result in the performance of one or more of the operations described with respect to that aspect.

The details of one or more implementations are set forth in the accompanying drawings and the description below. Other features will be apparent from the description, the drawings, and the claims.

DETAILED DESCRIPTION

Figure 1:
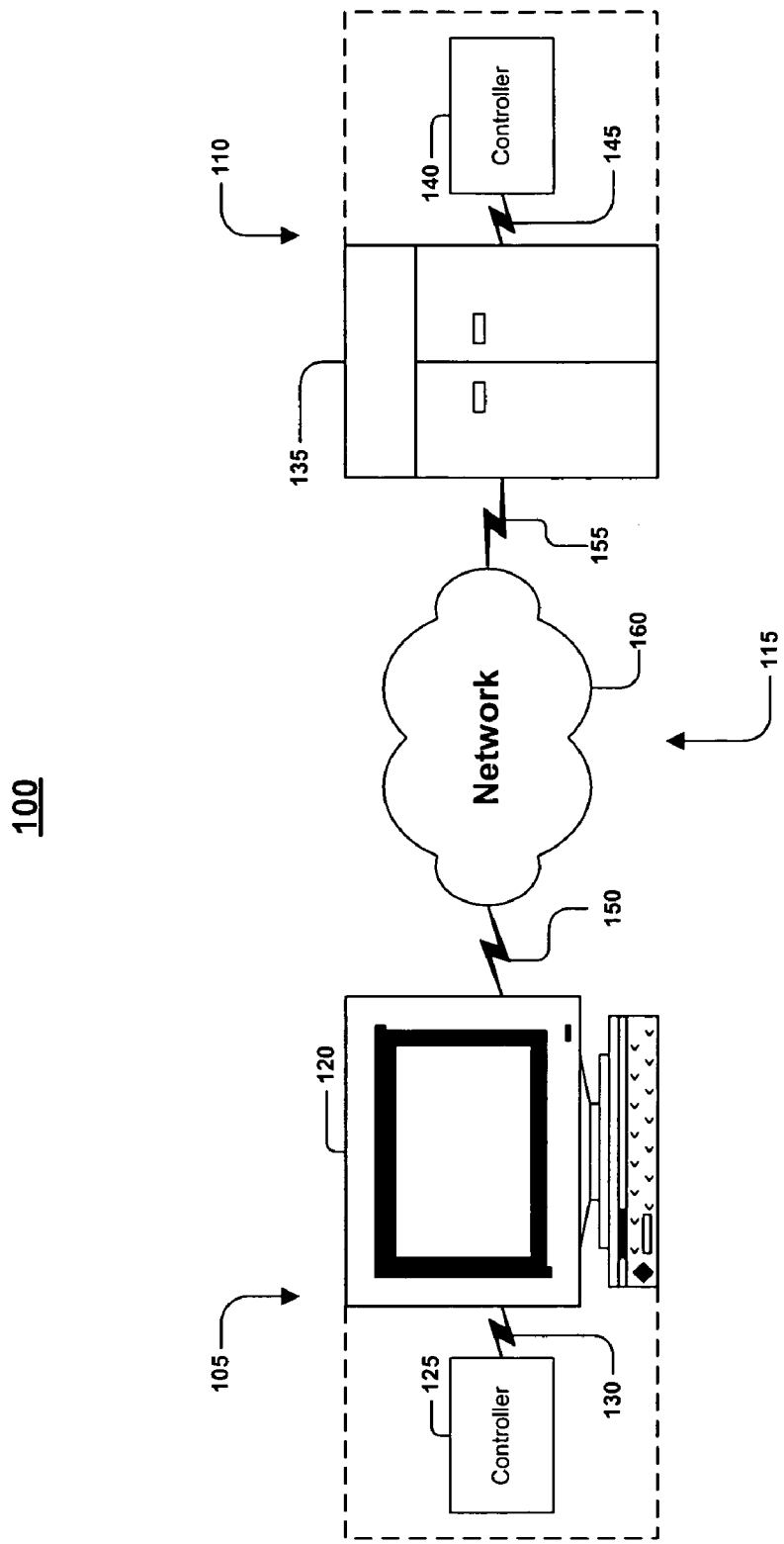
FIG. 1 is a block diagram of a general system configured to restrict the volume of outbound electronic messages.

In one implementation, the volume of outgoing electronic mail ("email") messages is restricted by using a ticket, as follows. A user logs-in to an email service provider over the World Wide Web (the "web") and, after verification of the user's identity, the user selects an appropriate icon provided by the email service provider to begin composing an email message. When the icon is selected, the user's browser sends a request to the email service provider, which issues a ticket for the user and returns the ticket, in the form of a cookie, over the web back to the user's browser. The ticket, in this implementation, is a time stamp of the email message that was most recently sent on behalf of the user. A time stamp refers to information that identifies the time at which the email message from the user was sent to the intended recipient.

When the user finishes composing the email message, the user attempts to send the email message by pressing an appropriate icon (such as, for example, a "send" button). The user's machine creates a message-send request that includes the ticket and the outgoing email message, and the user's machine sends the message-send request to the email service provider over the web.

When the email service provider receives the ticket and the email message, the email service provider again determines the time stamp for the email message that was most recently sent for the user. The email service provider does not simply assume that the received ticket still contains the time stamp for the email message that was most recently sent, because another email message may have been sent for the user after the ticket (received in the message-send request) was issued. The email service provider compares the determined time stamp with the time stamp in the ticket. If the two time stamps are the same, then the ticket is considered to be valid and the email service provider approves the email message for sending to the intended recipients. However, if the two time stamps are not the same, then the ticket is considered to be invalid and the email service provider may refuse to approve or may delay approving the email message for sending to the intended recipients.

If the email service provider receives, for example, two message-send requests from the user at the same time, the email service provider handles the two requests in turn to determine if each has a valid ticket. Assuming the first request has a valid ticket, the email message associated with the first request will be approved and sent to the intended recipients, and that email message will become the email message that was most recently sent for the user. Accordingly, the ticket associated with the second request will no longer be valid because the ticket in the second request will no longer contain the time stamp from the email message that was most recently sent. In this implementation, therefore, if a user sends multiple send requests (each request being associated with an email message) at the same time, the email service provider may prevent or hinder the email messages associated with all but one of the requests from being sent to the intended recipients.

Figure 2:
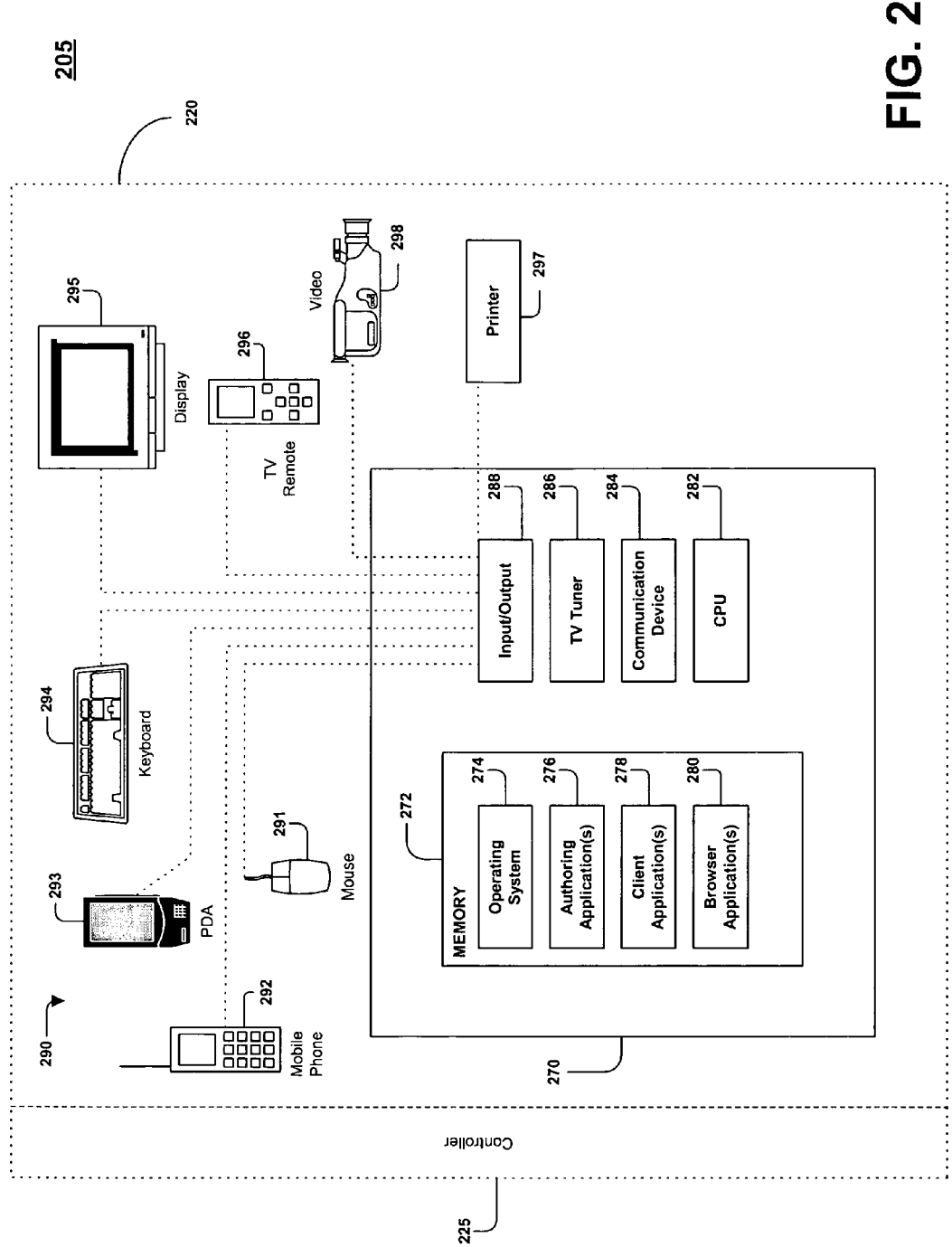
FIG. 2 is a block diagram of a computer system of FIG. 1.

Referring to FIGS. 1-2, various architectures are shown that implement, for example, one or more of the disclosed techniques relating to restricting the volume of outgoing electronic messages from a given user, which techniques are illustrated by and described with respect to FIGS. 3-10.

Referring to FIG. 1, a system 100 that implements at least one disclosed technique includes a user computer system 105 coupled to a host computer system 110 over a communications link 115. User computer system 105 includes a user device 120 connected to a user controller 125 by a wired or a wireless data pathway 130 capable of delivering data. Host computer system 110 includes a host device 135 connected to a host controller 140 by a wired or a wireless data pathway 145 capable of delivering data.

User device 120 (or host device 135) is generally capable of executing instructions under the command of user controller 125 (or host controller 140). One example of user device 120 is a device driver.

Communications link 115 includes a delivery network 160 making a direct or an indirect communication link between user computer system 105 and host computer system 110, irrespective of physical separation. Communications link 115 includes communication pathways 150 and 155 that enable communications through delivery network 160.

Referring to FIG. 2, a user computer system 205 is an example of user computer system 105 of FIG. 1. User computer system 205 includes a user device 220 that is analogous to user device 120 and a user controller 225 that is analogous to user controller 125. User controller 225 controls user device 220.

User device 220 includes a general purpose computer 270 having an internal or external storage 272 for storing data and programs such as an operating system 274 (for example, DOS, Windows®, Windows®95, Windows® 98, Windows® 2000, Windows® NT, Windows® Millennium Edition, Windows® XP, OS/2, or Linux) and one or more application programs. Examples of application programs include authoring applications 276 (for example, word processing programs, database programs, spreadsheet programs, presentation programs, or graphics programs) capable of generating documents or other electronic content; client applications 278 (for example, AOL user, CompuServe user, AIM user, AOL TV user, or ISP user) capable of communicating with other computer users, accessing various computer resources, and viewing, creating, or otherwise manipulating electronic content; and browser applications 280 (for example, Netscape's Navigator or Microsoft's Internet Explorer) capable of rendering standard Internet content.

General-purpose computer 270 also includes a central processing unit 282 ("CPU") for executing instructions in response to commands from user controller 225. In one implementation, user controller 225 includes one or more of the application programs installed on internal or external storage 272 of general-purpose computer 270. In another implementation, user controller 225 includes application programs externally stored in and executed by one or more device(s) external to general-purpose computer 270.

General-purpose computer 270 includes a communication device 284 for sending and receiving data over, for example, communications link 115, and a television ("TV") tuner 286 for receiving television programming. As a result, user device 220 can selectively and/or simultaneously display network content received by communication device 284 and television programming content received by TV tuner 286. General-purpose computer 270 also includes an input/output interface 288 to enable a wired or a wireless connection to various peripheral devices 290. Examples of peripheral devices 290 include a mouse 291, a mobile phone 292, a personal digital assistant 293 ("PDA"), a keyboard 294, a display monitor 295 with or without a touch screen input, a TV remote control 296, a printer 297, and a video camera 298.

Figure 3:
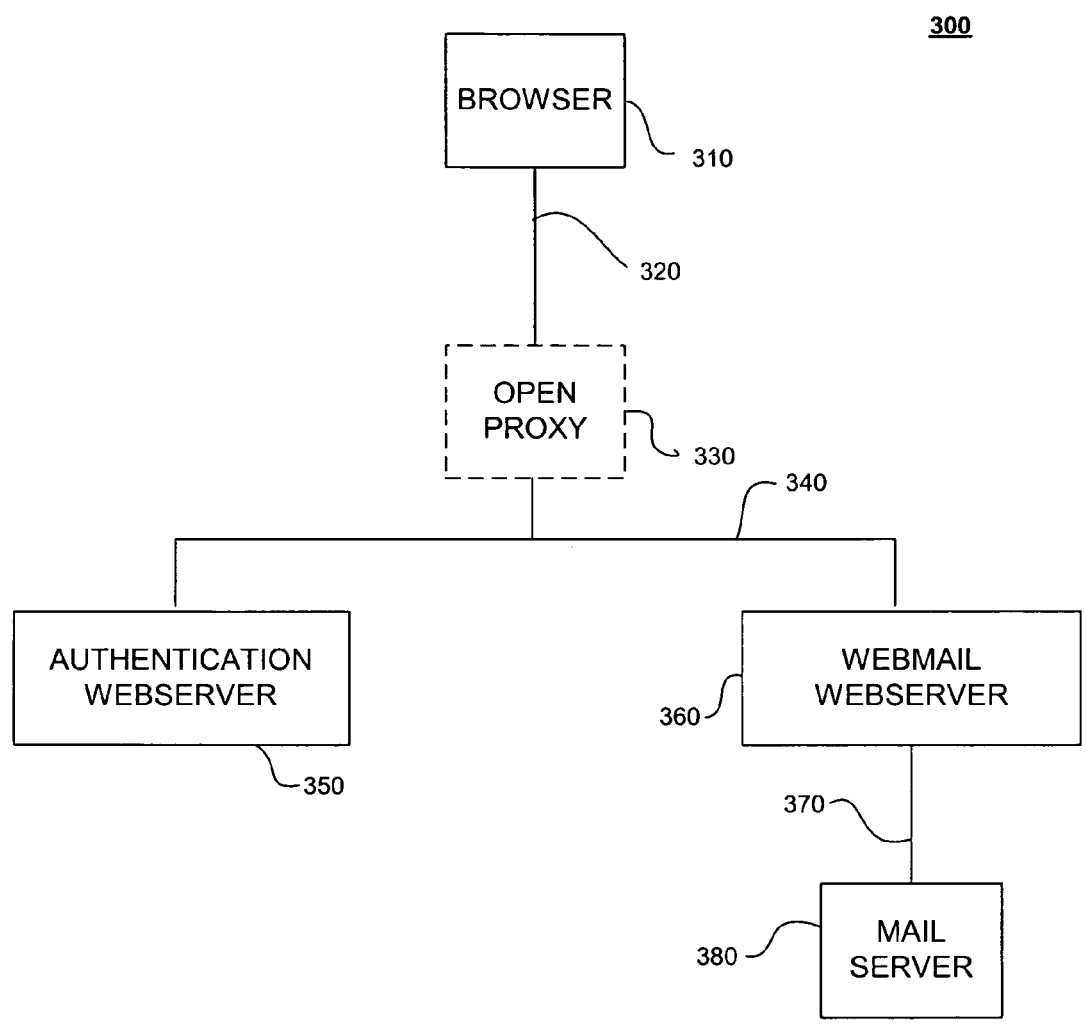
FIG. 3 is a block diagram of another system configured to restrict the volume of outbound electronic messages.

Referring to FIG. 3, a system 300 is shown that may be used, for example, to restrict the volume of outgoing electronic messages from a given user. System 300 includes a browser 310 that may be running, for example, as browser application 280 on computer 270. Browser 310 optionally communicates over a communications link 320 with an open proxy 330. The dashed box enclosing open proxy 330 indicates that open proxy 330 is optional in system 300. An "open proxy" is an example of an intermediary server that may sit between a browser and a destination webserver. Other examples include a) a firewall server for a corporation or other organization, and b) a web proxy server located, for example, on a client-side network (referred to as a forward proxy) or on a server side network (referred to as a reverse proxy). Communications link 320 may be analogous, for example, to communications link 115 and may include a delivery network such as the Internet (not shown).

Open proxy 330 may be a server on the Internet allowing a user to channel all Internet communications from browser 310 through open proxy 330. Communications from browser 310 that are directed through open proxy 330 and received by another device on the Internet appear to that other device as if the communications came from open proxy 330. In typical implementations, the communications appear to have originated from the Internet Protocol ("IP") address of open proxy 330 rather than the IP address of browser 310. Open proxies 330 also are capable of changing their IP address over time.

Open proxies are often used in corporate environments to channel all Internet traffic through a single device. Open proxies also are used, however, by users that send spam because the open proxy hides the user's IP address. By hiding the user's IP address, the open proxy may allow the user (spam sender) to defeat anti-spam measures that limit or block messages sent from a single IP address. The user may defeat the anti-spam measures by, for example, moving to another open proxy after the IP address of one open proxy is limited. If the open proxy changes its IP address, the user may not even need to move to another open proxy.

Open proxy 330 communicates over a communications link 340 with an authentication webserver 350 and a webmail webserver 360. Authentication webserver 350 and webmail webserver 360 may be, for example, part of an information and communication service provider such as, for example, America Online. Authentication webserver 350 selectively provides permission to access webmail webserver 360 or the services that are accessed through webmail webserver 360. Authentication webserver 350 may selectively provide permission by requiring a user to log-in or by otherwise verifying that a user is authorized to use webmail webserver 360 or the services that are accessed through webmail webserver 360.

Webmail webserver 360 communicates over a link 370 with a mail server 380. Mail server 380 also may be, for example, part of an information and communication service provider along with authentication webserver 350 and webmail webserver 360. Webmail webserver 360 interacts with the browser 310 to provide a user interface to an electronic messaging service such as email, and mail server 380 cooperates with the webserver 360 to provide the electronic messaging service. Webmail webserver 360 may communicate with mail server 380 using, for example, a protocol for communications between a mail-reading client and a mail server, such as, for example, Internet Message Access Protocol ("IMAP"). More generally, link 370 may be, for example, a dedicated link or may include, for example, a public delivery network such as the Internet. Link 370 may be analogous to, for example, data pathway 130 or 145, or communications link 115. Mail server 380 communicates with other mail servers (not shown) to deliver and receive email for users. Mail server 380 may communicate with other mail servers using a protocol, such as, for example, Simple Mail Transfer Protocol ("SMTP").

Webmail webserver 360 also provides a ticket to browser 310 that allows the user to send an email message. The ticket may be issued in various forms to achieve different objectives. For example, (i) the ticket may be a single-use ticket that allows the user to send one email message, or the ticket may allow multiple uses, (ii) the ticket may be unlimited in its time duration or may be for a limited time only (for example, the ticket may be valid between August 15 at 5 pm and August 17 at 5 am), and (iii) a ticket with a limited time duration may be valid for a known duration or an uncertain duration. An example of a ticket with a limited, but uncertain, time duration, is a ticket containing a time stamp of the email message that was most recently sent, wherein the ticket is valid for one use as long as no email message is sent after the ticket is issued and before the ticket is used.

In one implementation, the ticket includes some information identifying the email message most recently sent for the user. The identifying information may be, for example and as discussed above, a time-stamp or ID of the most recently sent message. In this implementation, webmail webserver 360 fetches the identifying information from mail server 380 and returns it to browser 310 in, for example, a cookie. This format for a ticket is particularly advantageous in systems that already store such identifying information on, for example, mail server 380, because no additional information needs to be stored. However, other ticket formats may be used as an alternative or in addition to the identifying information, such as, for example, a random number, and such formats may require additional storage (for example, storage of the random number or a seed to generate the random number).

In order to increase the confidentiality and authenticity of the ticket, webmail webserver 360 may, for example, either encrypt the ticket using suitably strong cryptographic algorithms and techniques before sending the ticket to the user, or may require that the interaction between the browser and server take place over a secure channel, such as an SSL-protected network connection.

System 300 may be modified to include multiple webmail webservers (not shown), each of which, for example, could be accessed through a browser and could communicate with mail server 380 to issue and verify tickets and to send email messages. System 300 also may be extended to include multiple mail servers (not shown). The multiple mail servers may, for example, coordinate actions for a given user's message-send requests, or delegate all message-send requests for a given user to a particular mail server. Any particular webmail webserver or mail server may be implemented, for example, across multiple servers or in a single server.

Figure 4:
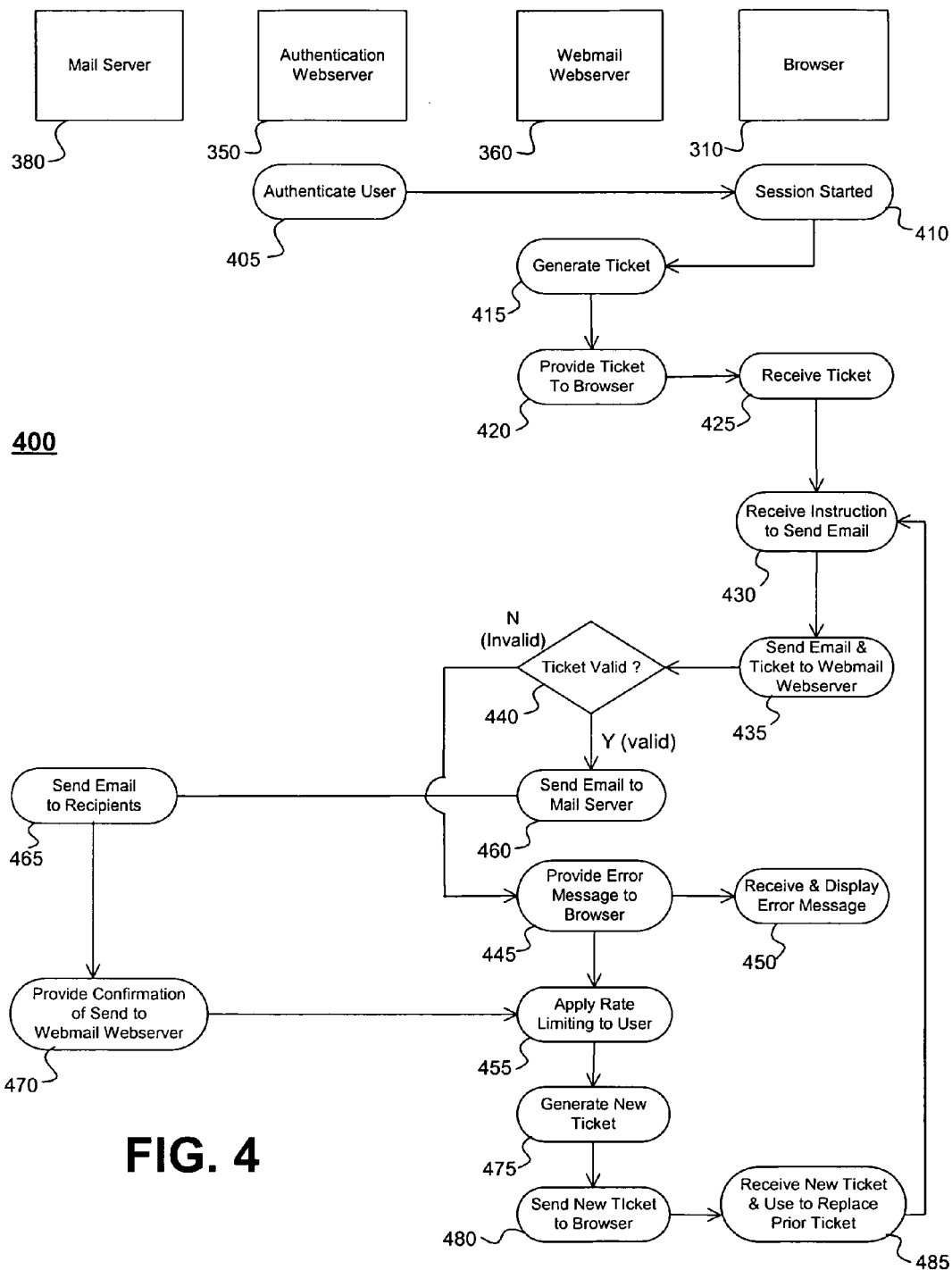
FIG. 4 is a flow chart of a process that may be used with, for example, the system of FIG. 3.

Referring to FIG. 4, a process 400 is shown for restricting the volume of outgoing electronic messages, such as, for example, email messages, from a given user. Process 400 may be implemented on a variety of systems and architectures, but for clarity of presentation is described below in the context of system 300.

Process 400 includes authentication webserver 350 authenticating a user (405). The user may provide, for example, a user ID and a password to log-in to, for example, an information and communication service provider. If the user is authenticated (405), then permission may be given to access webmail webserver 360. The permission may be included in a cookie that is provided to browser 310 and written on the computer of the user.

After the user is authenticated (405), an email session may be started (410). A session refers to a connection that is established for communication and that is characterized by an identifier and by the two end devices that are communicating. Thus, a session may be characterized, for example, by the IP address of the user's computer, the IP address of a webmail webserver, and an identifier such as a user ID.

The email session may be started, for example, by the user using browser 310 to click on a link to start the email session. In other implementations, the session may be started automatically after log-in. In one implementation, browser 310 must use the cookie received from authentication webserver 350 to start a session with webmail webserver 360. The email session may be provided, for example, by an application that is resident on a host computer or the user's computer, or that has components on both a host computer and the user's computer.

After the email session is started (410), webmail webserver 360 generates a ticket (415) and provides the ticket to browser 310 (420) which receives the ticket (425). The ticket allows the user to send an email message. The ticket may be provided, for example, automatically when the electronic mail session is established, or the ticket may be provided in response to the user clicking on a "new" icon to begin composing an email message. The ticket may be provided to browser 310 (420) in, for example, a cookie which browser 310 stores on the user's computer. Webmail webserver 360 also may store the ticket generated in operation 415.

After browser 310 receives the ticket (425), browser 310 receives an instruction to send an email message (430). The instruction may be received, for example, after the user composes an email message and presses a "send" button. Browser 310 then sends to webmail webserver 360 a message-send request that includes the email message and the ticket (435).

Webmail webserver 360 receives the message-send request that was sent by browser 310 (435) and then determines whether the ticket is valid (440). In one implementation, the ticket includes a time stamp that corresponds to the email message that was most recently sent for the user at the time of ticket generation. In such an implementation, webmail webserver 360 may determine whether the ticket's information (the time stamp) is valid by, for example, requesting a new ticket (with the new ticket reflecting the time stamp of the email message most recently sent at or just prior to the time of the comparison) and determining whether the new ticket matches the ticket received from browser 310 in operation 435. The two tickets will not match if, for example, the user had (i) started two sessions in operation 410, referred to as the first session and the second session, (ii) received the same ticket in each session, (iii) sent a message-send request on the second session, for which the ticket has already been verified, and (iv) sent a message-send request on the first session, for which the ticket is presently being verified. The reason the two tickets will not match is that the ticket requested in operation 440 will contain a time stamp from the sending of the email message on the second session, and that time stamp will be later than the time stamp of the ticket in the message-send request sent on the first session.

If webmail webserver 360 determines that the ticket is not valid (440), then webmail webserver 360 provides an error message to browser 310 (445) and browser 310 receives and displays the error message (450). The error message may contain, for example, a statement that the ticket was not valid and an indication of why the ticket was not valid. The error message also may inform the user that, for example, the message was not sent. If the message is not sent, the message may be returned to the user to allow the user to resubmit the message in another message-send request. After providing the error message (445), webmail webserver 360 applies a rate limiting algorithm to the user (455), as explained in more detail further below with respect to operation 455. In implementations in which the error message of operation 450 provides the user with the message and allows the user to resubmit the message in another message-send request, the rate limiting algorithm may be applied before sending the error message in operation 450.

If webmail webserver 360 determines that the ticket is valid (440), then webmail webserver 360 sends the email message to mail server 380 (460) and mail server 380 sends the email message to the intended recipient(s) (465). After sending the email message (465), mail server 380 (or another appropriate device or component) may update the time stamp that contains the time at which the last message for the user was sent, and the time stamp would be updated to reflect the time at which the message was sent in operation 465. Mail server 380 also provides a confirmation to webmail webserver 360 that the email message was sent (470).

After receiving confirmation that the email message was sent to the intended recipients (470), or after providing an error message to browser 310 (445), webmail webserver 360 applies a rate limiting algorithm to the user (455). If mail server 380 is unable (not shown) to send the email message, mail server 380 may notify (not shown) webmail webserver 360 of the failure and webmail webserver 360 may take a variety of actions (not shown), such as, for example, notifying browser 310 and then proceeding to apply a rate limiting algorithm (455). As an alternative, or in addition, to mail server 380 notifying webmail webserver 360 of a failure (not shown), webmail webserver 360 may assume that a failure has occurred if a particular amount of time elapses after sending the email message to mail server 380 (460) without a confirmation being sent (470).

The rate limiting algorithm may be used, for example, to limit the rate at which email messages are sent for the user. One example of rate limiting entails enforcing a minimum wait time between sending successive messages for a user. The minimum wait time may be used with, for example, an implementation in which a time stamp is available for the email message that was most recently sent for the user. The time stamp may be compared to a current time to ensure that a minimum required wait time, such as, for example, fifteen seconds, has elapsed. The time stamp may, for example, always be fetched to perform the comparison. However, if the ticket includes the time stamp, and the ticket is valid (440), then the time stamp in the ticket may be compared to the current time. If the ticket is not valid (440), then the time stamp for the email message that was most recently sent for the user will need to be fetched, for example. The minimum wait time, or the rate limiting in general, may be varied for different users based on, for example, past behavior of the user, network usage, or other criteria. In one implementation, the minimum wait time is increased for users that have sent spam in the past.

After applying the rate limiting algorithm (455), webmail webserver 360 generates a new ticket (475) and sends the new ticket to browser 310 (480). Alternatively, implementations may determine to generate (475) and send (480) a new ticket only if the previous ticket was valid (440). As mentioned in the discussion of operation 415 above, webmail webserver 360 also may store the ticket generated in operation 475.

After webmail webserver 360 sends the new ticket (480), browser 310 receives the new ticket and uses the new ticket to replace the prior ticket (485). In an implementation in which the ticket is stored, for example, in a cookie on the user's computer, browser 310 may replace the prior ticket by, for example, overwriting the cookie that contains the prior ticket with a new cookie that contains the new ticket. After receiving the new ticket and replacing the prior ticket (485), browser 310 will use the new ticket if, for example, browser 310 receives another instruction to send an email message (430).

Process 400 may prevent or hinder system 300, for example, from sending electronic mail messages too frequently for a given user. In order for each message-send request to include a ticket that will be valid, process 400 requires that the user wait until a new ticket is returned after a message is sent to the intended recipient(s).

To illustrate one particular scenario that may be prevented by process 400, assume that a user (i) uses the cookie received from authentication webserver 350 (405) to start concurrent sessions (410), with one session at each of multiple webmail webservers, (ii) receives a common ticket from each of the webmail webservers for each session (425), and (iii) sends message-send requests simultaneously from each of the concurrent sessions, with each request including the common ticket (435). Process 400 requires that each message-send request include a ticket (435), and that the ticket be valid (440). Assume further that the ticket includes a time stamp from the message that was sent most recently, and that the implementation updates the time stamp each time an email message is sent (465). Accordingly, if the first of the simultaneous requests is processed and the corresponding message is sent (465), an attempt to verify the ticket in the remaining requests will fail (440). To ensure that a new message is sent to its intended recipients, a user may have to wait until the user's previous message is sent (465) to its intended recipients and a new ticket is received (485). Then, after receiving the new ticket (485), the user may send a message-send request for the new message (435).

In the above scenario, it is assumed that multiple webmail webservers have access to a user's time stamp for the email message that was most recently sent. Such access may be coordinated by, for example, mail server 380.

After determining that a ticket is not valid (440), an implementation may perform a variety of measures with respect to additional message-send requests from a given user. For example, an implementation may (i) refuse to send a message from any message-send request that has already been received from the given user, and such refusal may be made without evaluating the associated ticket(s), and/or (ii) refuse to send a message from any message-send request from the given user that is received after the ticket is determined to be not valid in operation 440 but before a certain amount of time has elapsed since the determination (440). The measure performed also, or alternatively, may depend on one or more other criteria, such as, for example, (i) the number of previous message-send requests from the user that have been determined to have invalid tickets, (ii) the number of previous message-send requests from the user that have been determined to have invalid tickets within a specified length of time, or (iii) determining that a subsequent message-send request was received from the user after a message from an earlier message-send request was sent but before a new ticket was generated for the user.

Figure 5:
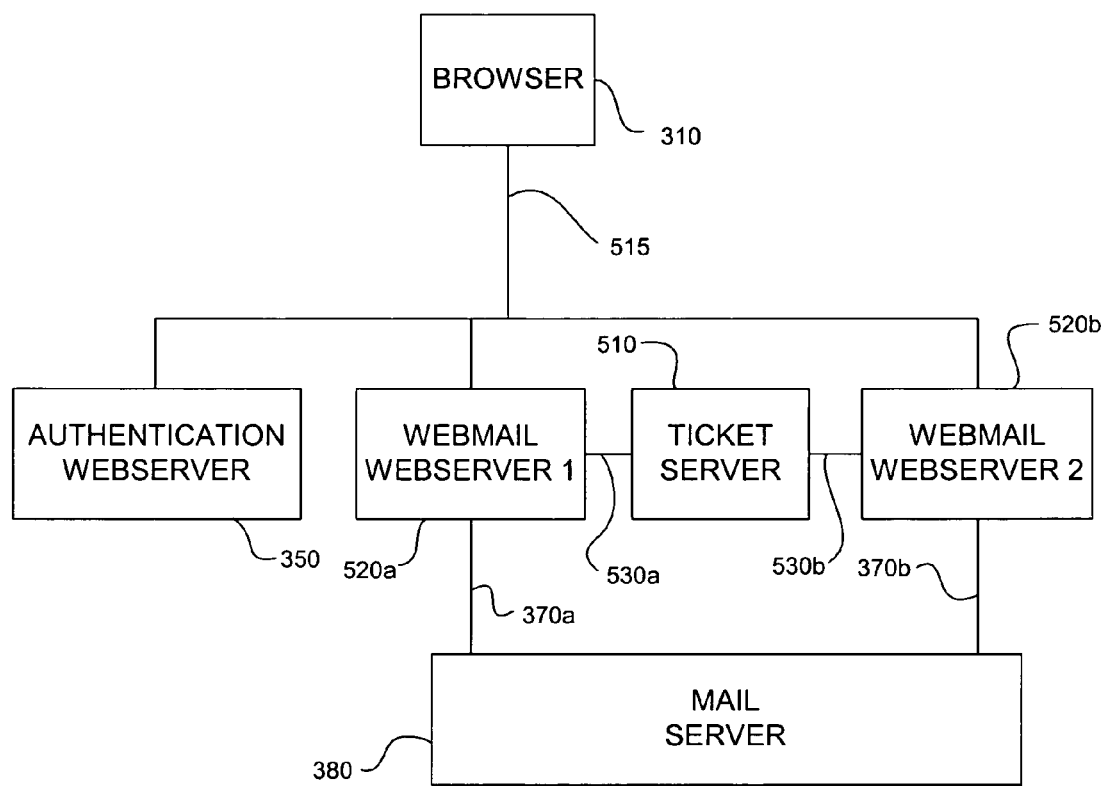
FIG. 5 is a block diagram of a system including a ticket server that is configured to restrict the volume of outbound electronic messages.

Referring to FIG. 5, a system 500 is shown that may used, for example, to restrict the volume of outgoing electronic messages from a given user. System 500 is similar to system 300, but includes several differences, such as, for example, system 500 includes a ticket server 510 that communicates with a first webmail webserver 520a and a second webmail webserver 520b. As another example of the differences, system 500 does not include optional proxy server 330. Rather, browser 310 communicates with other devices over a communications link 515 that may be, for example, analogous to one or more of links 320 and 340.

Ticket server 510 is a common server with which each of webmail webservers 520a and 520b communicate to issue and verify tickets for a given user. This is distinct from system 300 in which webmail webserver 360 (recall that system 300 may be extended to include multiple webmail webservers) communicates with mail server 380 to issue and verify tickets for a given user. Ticket server 510 stores a single ticket for each user, and may index the ticket by the user's ID. Ticket server 510 services one request at a time for a given user to either issue or verify a ticket. In this way, ticket server 510 serializes, for a given user, requests from webmail webservers 520a and 520b for ticket issuance or verification. Serialization may prevent multiple sessions from simultaneously verifying a common ticket before any of the sessions update the stored ticket.

Ticket server 510 may service one request at a time from a given user by using a modified mutual exclusion locking method. Typically, mutual exclusion locking methods are used to allow multiple program threads to share the same resource, such as accessing a file, but not to share the resource simultaneously. Ticket server 510 may lock the stored ticket for each user. When a thread, such as, for example, an instantiation of a ticket verification routine running on ticket server 510, accesses the stored ticket for a given user, the thread may lock the ticket to prevent any other thread from accessing the stored ticket. If the thread is issuing a new ticket, the thread may release the lock after acquiring the stored ticket and sending the ticket to the user. Certain implementations do not even lock the stored ticket when issuing a ticket. However, if the thread is verifying a ticket received in a message-send request, then, assuming that the ticket is verified as being valid, the thread may hold the lock until after the message associated with the message-send request is sent to the intended recipients and the stored ticket is updated.

Ticket server 510 may be implemented using, for example, (i) a single, dedicated server, (ii) a collection of two or more dedicated servers, or (iii) one or more webmail webservers performing the webmail webserver duties and also performing the ticket server duties in the same way as dedicated ticket servers. If multiple servers are used to implement ticket server 510, each webmail webserver may use the same user-to-ticket-server mapping to ensure that each webmail webserver communicates with the appropriate and same ticket server on behalf of a given user.

Webmail webservers 520a and 520b communicate with (i) ticket server 510 over a link 530a and a link 530b, respectively, and (ii) mail server 380 over a link 370a and a link 370b, respectively. Links 530a, 530b, 370a, and 370b may each be analogous, for example, to link 370.

Figure 6:
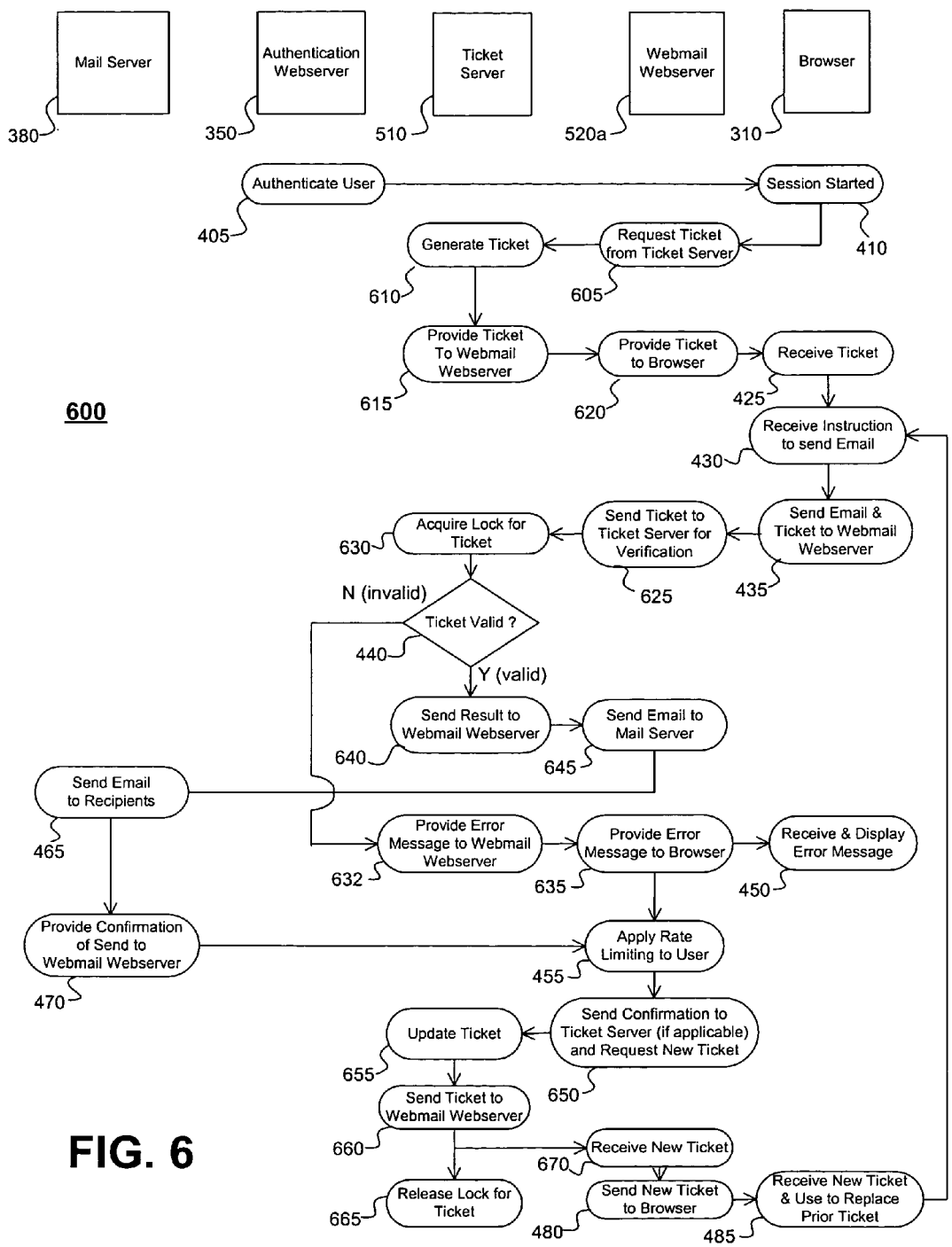
FIG. 6 is a flow chart of a serialization process that may be used with, for example, the system of FIG. 5.

Referring to FIG. 6, a process 600 is shown for restricting the volume of outgoing electronic messages, such as, for example, electronic mail, from a given user. Process 600 may be implemented on a variety of systems and architectures, but for clarity of presentation is described below in the context of system 500. As described below, much of process 600 is similar to process 400 and, accordingly, common operations are not described in detail.

Process 600 includes authentication webserver 350 authenticating a user (405). If the user is authenticated, then permission may be given to access webmail webservers 520a and 520b. After the user is authenticated (405), an email session is started with, for example, webmail webserver 520a (410), and webmail webserver 520a requests a ticket from ticket server 510 (605).

After receiving the request for a ticket, ticket server 510 generates a ticket (610). As in process 400, the generated ticket may be stored. Ticket server 510 provides the ticket to webmail webserver 520a (615), and webmail webserver 520a provides the ticket to browser 310 (620). Browser 310 receives the ticket (425), receives an instruction to send an email message (430), and sends to webmail webserver 520a a message-send request that includes the email message and the ticket (435).

Webmail webserver 520a receives the message-send request that was sent by the browser and sends the ticket from the message-send request to ticket server 510 for verification (625). Ticket server 510 receives the ticket (the received ticket) and acquires a lock (630) to verify the received ticket. Ticket server 510 may acquire a lock by, for example, locking the resource that contains the stored value (for example, a time stamp) for the currently valid ticket for the user. Accordingly, ticket server 510 then determines whether the received ticket is valid (440) by, for example, comparing the received ticket to the stored value to determine if the two match, in which case the ticket is valid.

If ticket server 510 determines that the ticket is not valid (440), then ticket server 510 provides an error message to webmail webserver 520a (632), and webmail webserver 520a provides an error message to browser 310 (635). Browser 310 receives and displays the error message (450). After providing the error message (635), webmail webserver 520a applies a rate limiting algorithm to the user (455).

If ticket server 510 determines that the ticket is valid (440), then ticket server 510 notifies webmail webserver 520a (640), webmail webserver 520a sends the email message to mail server 380 (645), and mail server 380 sends the email message to the intended recipients (465). Mail server 380 also provides a confirmation to webmail webserver 520a that the email message was sent (470). As described above in the discussion of process 400, process 600 may be adapted to specifically address a situation in which mail server 380 is unable to send the email message in operation 465.

After receiving the confirmation from mail server 380, or after providing an error message to browser 310 (635) as described above, webmail webserver 520a applies a rate limiting algorithm to the user (455). After applying a rate limiting algorithm (455), webmail webserver 520a requests a new ticket from ticket server 510 (650). Further, if a confirmation was sent in operation 470, then webmail webserver 520a sends the confirmation to ticket server 510 along with the request for a new ticket (650). Ticket server 510 updates the ticket as needed (655), sends the ticket to webmail webserver 520a (660), and releases the lock (665) that was acquired in operation 630. Note that the stored ticket may not need to be updated, particularly if the received ticket was not valid (440).

The new ticket is received by webmail webserver 520a (670), and webmail webserver 520a sends the new ticket to browser 310 (480). Browser 310 receives the new ticket and uses the new ticket to replace the prior ticket (485). Browser 310 is then able to use the new ticket if browser 310 receives a new instruction to send an email message (430).

Process 600 may be used with a variety of different ticket systems. For example, in implementations in which the ticket includes a random number, ticket server 510 may generate a new random number (see operations 610, 655) whenever webmail webserver 520a requests a new ticket (see operations 605, 650). As another example, process 600 also may be adapted for implementations in which the ticket includes a time stamp from the latest message that was sent for the user. One such adaptation includes: (i) mail server 380 updates the time stamp after sending an email message in operation 465, and sends the updated time stamp to webmail webserver 520a along with the confirmation in operation 470, and (ii) webmail webserver 520a sends the updated time stamp to ticket server 510 along with the confirmation and the request for a new ticket in operation 650. Upon receipt of the updated time stamp, ticket server 510 may use the updated time stamp to update the ticket for the user in operation 655. In implementations using time stamp information, it may be advantageous to provide a direct connection between ticket server 510 and mail server 380 and to allow, for example, mail server 380 to send updated time stamps directly to ticket server 510. Furthermore, as mentioned earlier, implementations need not update the ticket in response to receiving a message-send request that does not have a valid ticket. The user may be required, for example, to begin a new session.

In particular implementations, a user may send multiple message-send requests (435) simultaneously, or in succession without waiting for a new ticket to be received (485). The user may send the multiple requests to, for example, a single webmail webserver in a single session. In the alternative or in addition, the user may, for example, issue a first request to webmail webserver 520a in a first session, and issue a second request to webmail webserver 520b in a second session. By using multiple webmail webservers, a user may attempt to circumvent rate limiting algorithms that are particular to a given webmail webserver and, therefore, may only be aware of a user's email messaging on a single webmail webserver.

In such implementations involving concurrent message-send requests, the portions of process 600 particular to ticket server 510 may be running in multiple threads at the same time on ticket server 510. Because a lock is acquired for ticket-verification requests (630), the tickets in the multiple requests are verified in a serial manner. For example, consider the scenario in which webmail webservers 520a and 520b separately and concurrently request ticket verification from ticket server 510 (625), and ticket server 510 launches two separate threads to handle the separate ticket-verification requests. Whichever thread acquires the lock (630) first will be able to perform the verification operations and the other thread will be forced to wait until the first thread releases the acquired lock (665), after possibly updating the stored ticket.

By serializing the verification of tickets for a given user, the volume of outbound email messages for the given user may be reduced. Process 600 also serializes the sending of a user's email messages to the intended recipients because the lock is maintained (see operation 665) until after the message is sent (465). Other implementations, such as, for example, an implementation that uses a random number for a ticket, may update the ticket immediately after verification and may unlock the ticket before the message is sent to its intended recipients. As discussed earlier, a stored ticket also may be unlocked based on a timed event to account, for example, for possible problems in sending a message, or possible system malfunctions.

Figure 7:
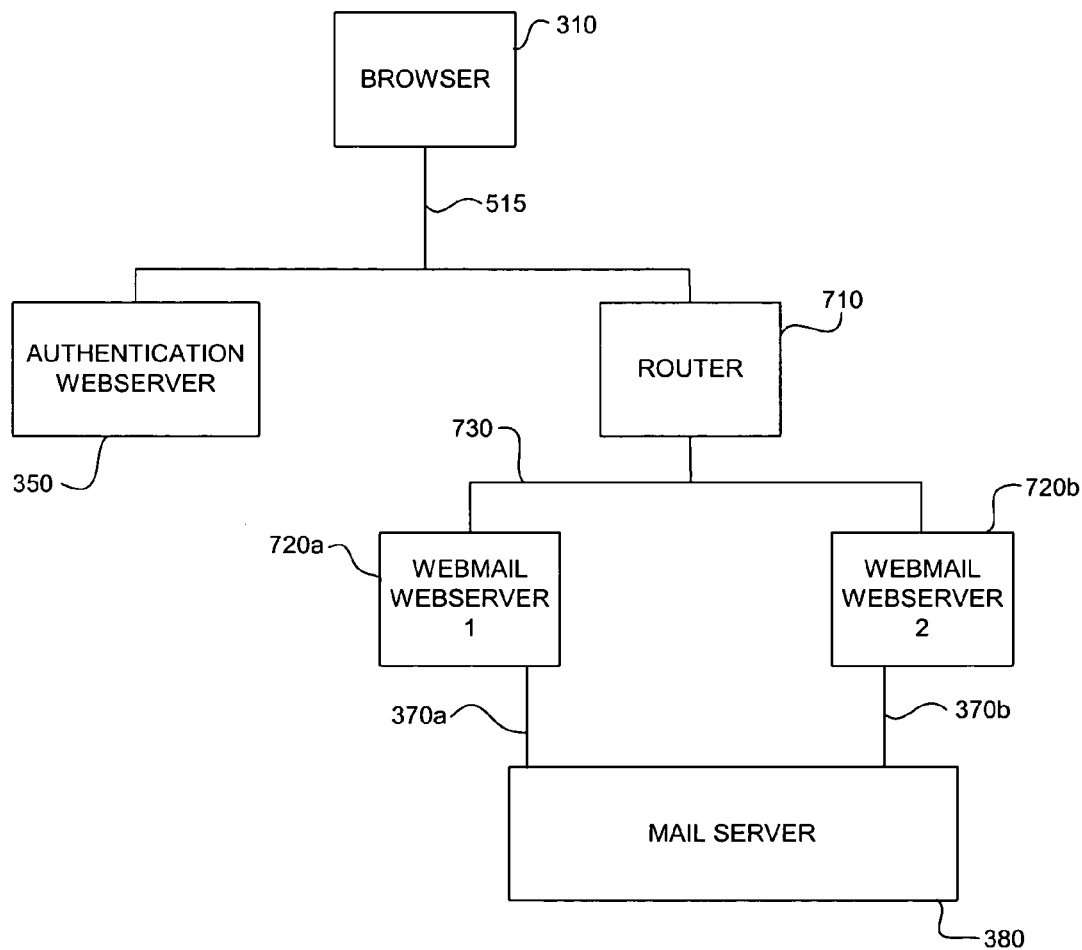
FIG. 7 is a block diagram of a system including a router that is configured to restrict the volume of outbound electronic messages.

Referring to FIG. 7, a system 700 is shown that may used, for example, to restrict the volume of outgoing electronic messages for a given user. While system 700 is similar to system 500, system 700 includes a router 710 disposed between, and communicating with, both open proxy 330 and authentication webserver 350 on one side, and both a first webmail webserver 720a and a second webmail webserver 720b on another side. Router 710 communicates with webmail webservers 720a and 720b over a link 730 that may be, for example, analogous to link 370.

Router 710 receives message-send requests from browser 310, and other browsers (not shown). Accordingly, the received message-send requests may be from various users. Router 710 maps a given user to a specific webmail webserver, and directs all message-send requests from the given user to the specific webmail webserver. Thus, rather than a given user's message-send requests going to a random webmail webserver, as may occur in certain implementations using system 500, the requests go to a specific webmail webserver. Router 710 may receive message-send requests by, for example, browser 310 sending message-send requests to router 710 rather than to a webmail webserver, or by router 710 intercepting message-send requests intended for a particular webmail webserver.

Webmail webservers 720a and 720b also perform the tasks of generating and verifying tickets for a given user. As with ticket server 510 in system 500, webmail webservers 720a and 720b perform user-level synchronization for the ticket verification requests and, possibly, for the ticket generation requests from a given user. Synchronization may be achieved using a modified multi-thread mutual exclusion locking technique, as described earlier in the discussion of ticket server 510, and the mutual exclusion locking technique may serialize the verification of tickets from all message-send requests, and possibly the sending of all messages, from a given user. Webmail webserver 720a or 720b may be mapped to multiple users, and may perform mutual exclusion locking separately for each user that is mapped to that webmail webserver 720a or 720b. The mutual exclusion locking may be performed in a variety of ways, one example of which is performing the locking in-memory.

Router 710 may be implemented using a network request-switching device that inspects the hypertext transfer protocol ("http") requests destined for webmail webservers 720a and 720b, extracts the user ID from the http requests, maps the user ID to a particular webmail webserver 720a or 720b using a hashing function, and then routes the http request to the appropriate webmail webserver 720a or 720b. Router 710 also may be implemented using software routing performed on, for example, a first tier of webservers deployed in front of webmail webservers 720a and 720b. The first tier of webservers may perform the same functions of inspection, extraction, mapping, and routing as the network request-switching device. Router 710 also may be implemented on the webmail webservers 720a and 720b, in a manner analogous to webmail webservers 520a and 520b performing the duties of ticket server 510.

Figure 8:
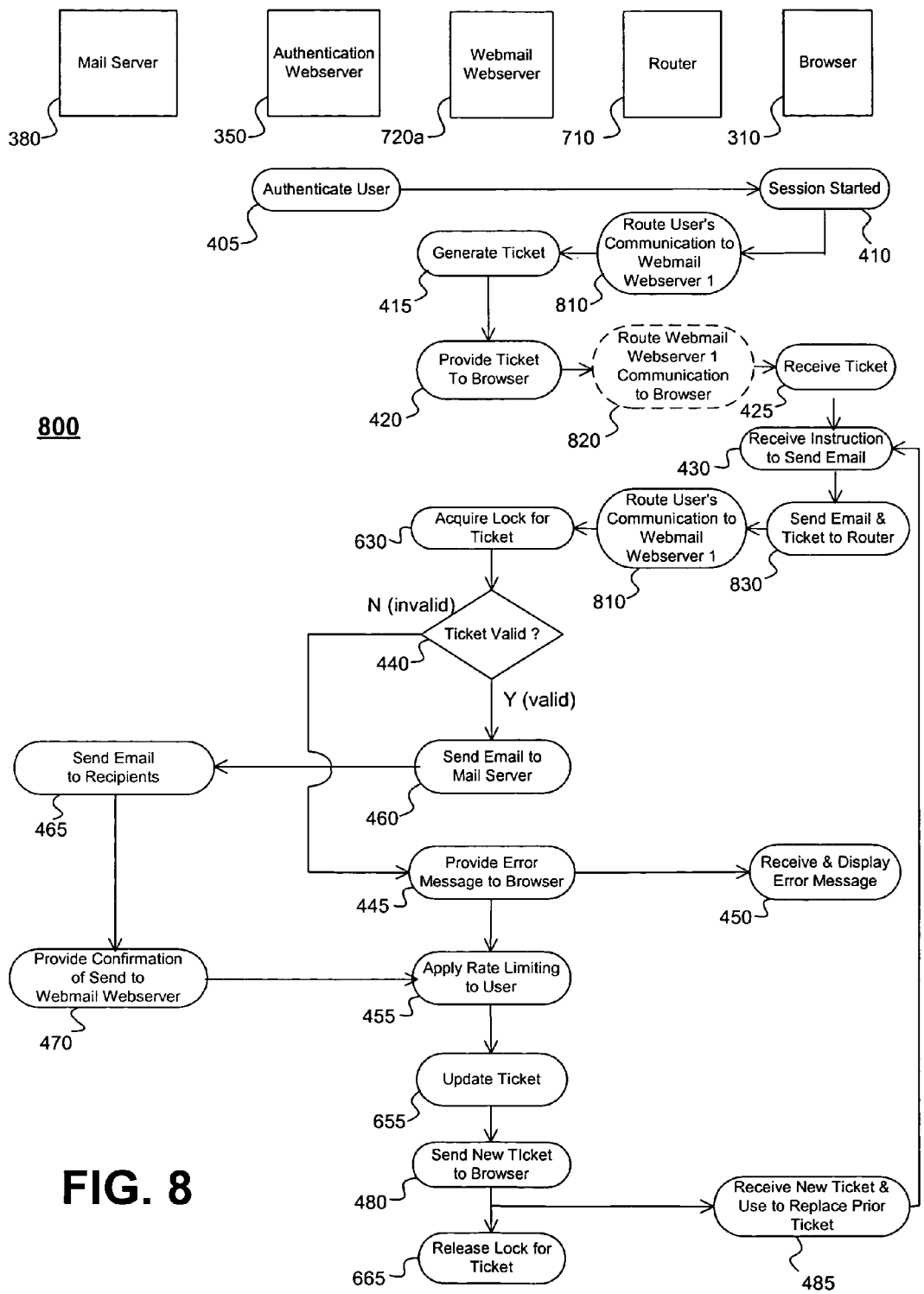
FIG. 8 is a flow chart of a serialization process that may be used with, for example, the system of FIG. 7.

Referring to FIG. 8, a process 800 is shown for restricting the volume of outgoing electronic messages, such as, for example, electronic mail, from a given user. Process 800 may be implemented on a variety of systems and architectures, but for clarity of presentation is described below in the context of system 700. As described below, much of process 800 is similar to processes 400 and 600, and, accordingly, common operations are not described in detail.

Process 800 includes authentication webserver 350 authenticating a user (405). After the user is authenticated (405), the user may use browser 310 to start an email session (410). The communication from browser 310 in operation 410 may be, for example, directed to, or intercepted by, router 710, and router 710 routes the communication to webmail webserver 720a (810). Router 710 may use, for example, a look-up table or a hashing function to map the user to webmail webserver 720a.

After the email session is started (410), webmail webserver 720a generates a ticket (415) and provides the ticket to browser 310 (420) which receives the ticket (425). Alternatively, webmail webserver 720a may provide the ticket to router 710 in operation 420, with router 710 routing the ticket to browser 310 (820). The alternative nature of operation 820 is indicated by the dashed lines in FIG. 8. This alternative is typically available, although not described, throughout process 800 for all communications from webmail webserver 720a that are ultimately intended for browser 310.

After browser 310 receives the ticket (425), browser 310 receives an instruction to send an email message (430). Browser 310 then sends to router 710 a message-send request that includes the email message and the ticket (830), and router 710 routes the message-send request to webmail webserver 720a (810).

Browser 310 may have received an indication with the received ticket (see 425) that all communications should be directed to webmail webserver 720a. Accordingly, implementations may bypass router 710 and skip operation 810 after, for example, the session is started. Implementations also, or alternatively, may attempt to shield from browser 310 any indication of the webmail webserver to which the user is mapped, and/or may have router 710 intercept all communications from browser 310 to any webmail webserver.

Webmail webserver 720a receives the message-send request and acquires a lock (630) by, for example, locking the resource that contains the stored value for the currently valid ticket for the user. Webmail webserver 720a then determines whether the ticket in the message-send request is valid (440).

If webmail webserver 720a determines that the ticket is not valid (440), then webmail webserver 720a provides an error message to browser 310 (445) and browser 310 receives and displays the error message (450). After providing the error message (445), webmail webserver 720a applies a rate limiting algorithm to the user (455).

If webmail webserver 720*a* determines that the ticket is valid (440), then webmail webserver 720*a* sends the email message to mail server 380 (460) and mail server 380 sends the email message to the intended recipient(s) (465). After sending the email message (465), mail server 380 (or another appropriate device or component) may update the time stamp, as described earlier. Mail server 380 also provides a confirmation to webmail webserver 720*a* that the email message was sent (470).

After receiving confirmation that the email message was sent to the intended recipient(s), or after providing an error message to browser 310 (445) as described earlier, webmail webserver 720*a* applies a rate limiting algorithm to the user (455), updates the ticket (655), sends the updated ticket to browser 310 (480), and unlocks the stored ticket resource (665).

After webmail webserver 720*a* sends the updated ticket (480), browser 310 receives the new ticket and uses the new ticket to replace the prior ticket (485). After receiving the new ticket and replacing the prior ticket (485), browser 310 will use the new ticket if, for example, browser 310 receives another instruction to send an email message (430).

Webmail webserver 720*a* is similar to webmail webserver 360 of system 300 in that both webmail webservers 360 and 720*a* perform the ticket generation and verification procedures. Webmail webserver 720*a* is similar to ticket server 510 of system 500 in that both components perform a modified mutual exclusion locking technique to serialize ticket verification for a given user. As an example of the serialization performed by webmail webserver 720*a*, if a user establishes two concurrent sessions, router 710 maps the given user to webmail webserver 720*a* for both sessions, and webmail webserver 720*a* receives all message-send requests from both sessions. If both sessions send a message-send request that includes a common ticket, webmail webserver 720*a* will lock the stored ticket resource upon receiving the first request for ticket verification (630). If the first ticket is verified, then the ticket will be updated (655) before the lock is released (665) (by, for example, unlocking a resource) and the second ticket verification operation is begun. As a result, the second ticket will not be verified because the second ticket will no longer be current.

System 700 and process 800 may be adopted, for example, to provide for less than complete serialization of a user's message-send requests. For example, router 710 may map each session for a given user to a different webmail webserver. Such a mapping would allow a user to send messages concurrently on each session, with a given webmail webserver serializing only the message-send requests on that webmail webserver.

Figure 9:
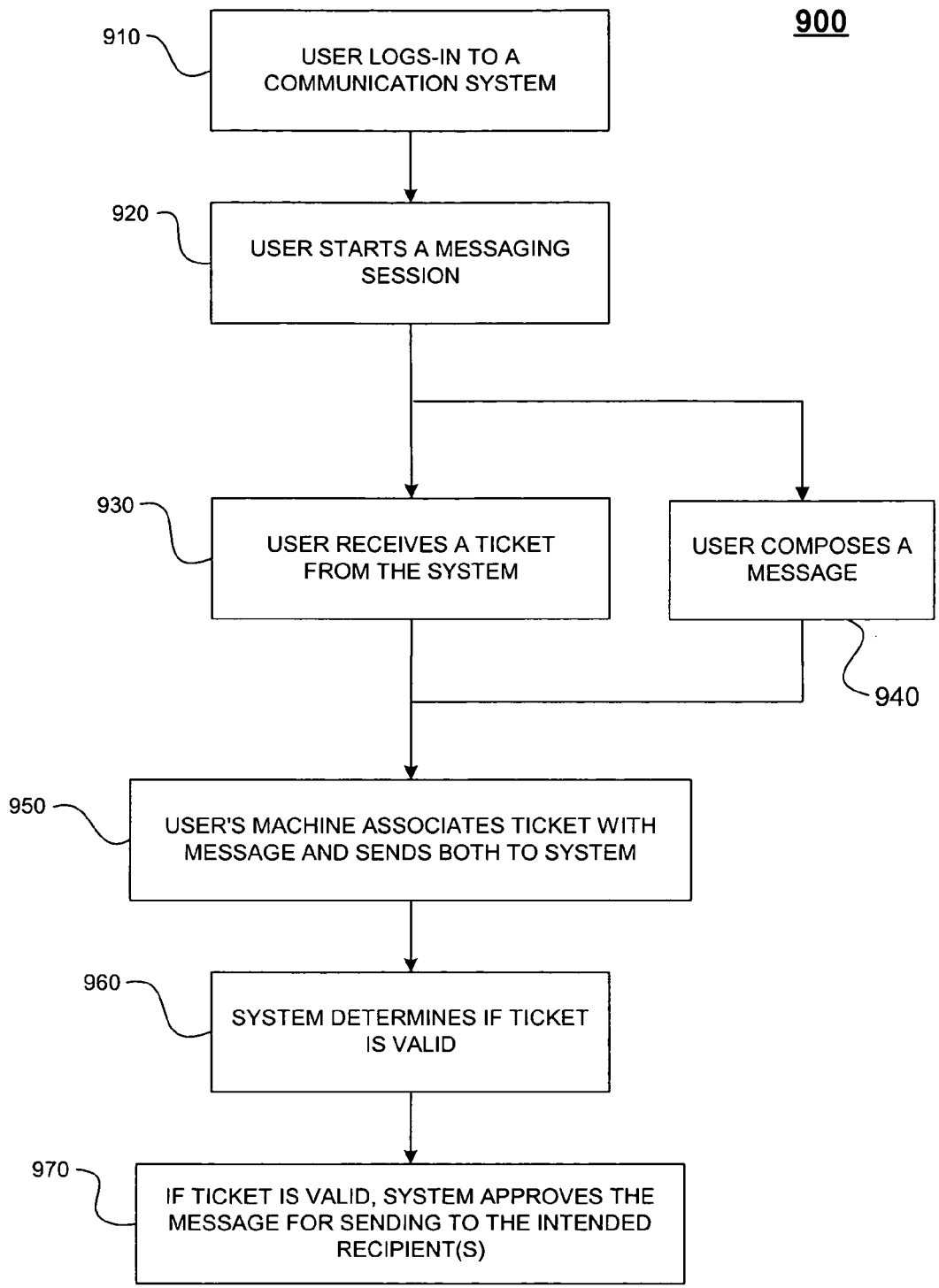
FIG. 9 is a flow chart of a generalized ticket-based process for sending electronic messages.

Referring to FIG. 9, a process 900 is shown for restricting the volume of outgoing electronic messages, such as, for example, electronic mail, from a given user. Implementations of process 900 may result in a generalized version of processes 400, 600, or 800. Process 900 includes a user logging in to a communications system (910) and starting a messaging session (920). The user then receives a ticket from the system (930) and composes a message (940). The user's machine associates the ticket with the message and sends both to the system (950). The system determines if the ticket received from the user's machine is a valid ticket (960) and, if the ticket is valid, the system approves the associated message for sending to the intended recipient(s) (970).

Figure 10:
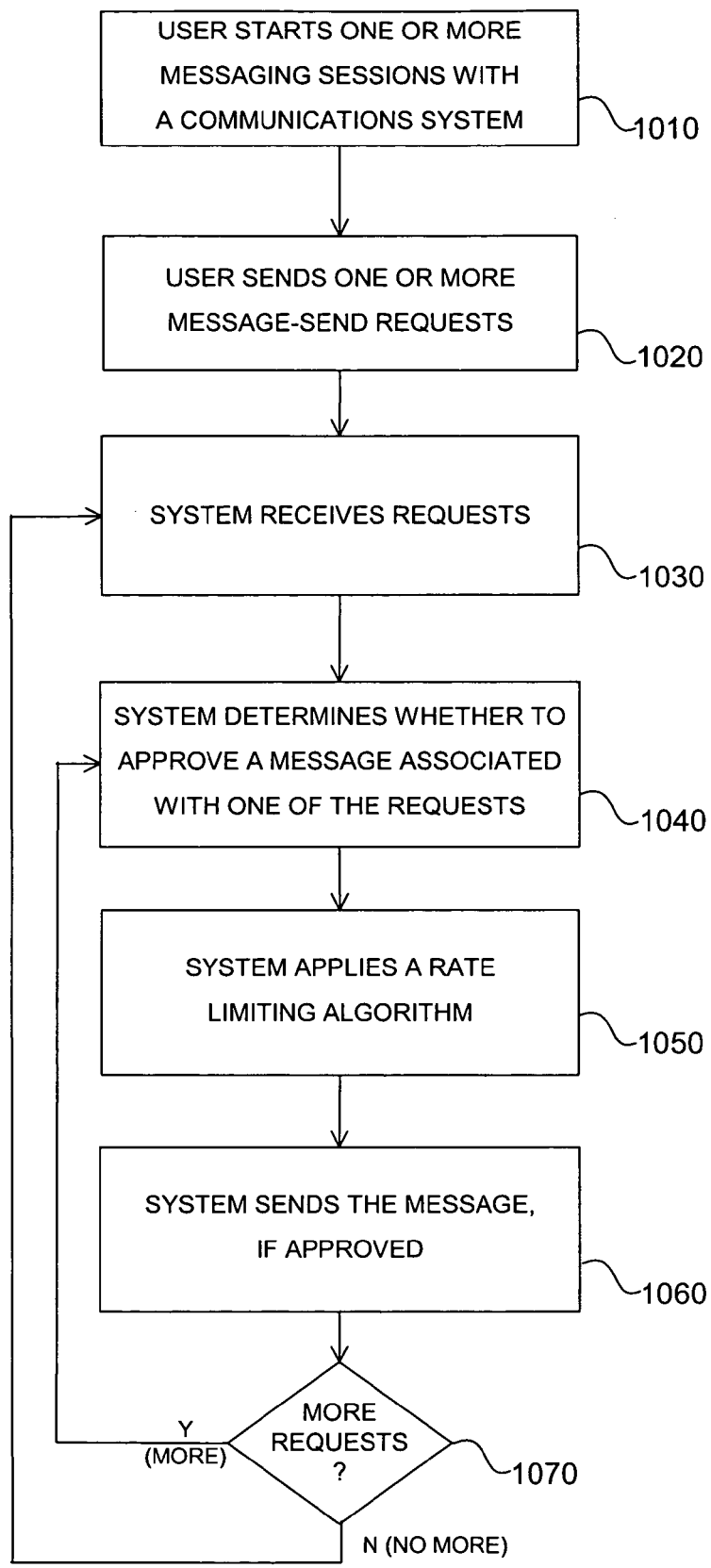
FIG. 10 is a flow chart of a generalized serialization process for sending electronic messages.

Referring to FIG. 10, a process 1000 is shown for restricting the volume of outgoing electronic messages, such as, for example, electronic mail, from a given user. Process 1000 allows for implementations that, for example, do not use a ticket-based system. Process 1000 includes a user starting one or more messaging sessions with a communications system (1010), and sending one or more message-send requests to the system (1020). Each of the message-send requests is associated with a message that the user desires to send. The message-send requests may be sent over, for example, a single session or multiple sessions, and the multiple sessions may be, for example, active concurrently.

The system receives the multiple message-send requests (1030) and determines, for one of the message-send requests, whether to approve the associated message for sending (1040). By addressing a single message at a time in operation 1040, process 1000 serializes the determination of whether to approve messages for sending. In an implementation in which multiple instantiations of process 1000 may be running concurrently in separate threads, this serialization may be achieved by, for example, locking a resource.

The determination of whether to approve a message (1040) may include, for example, verifying a ticket. Process 1000 also may be applied to systems that are not ticket-based. For example, operation 1040 may not require tickets and may approve all message-send requests from the user, merely introducing a delay associated with the serial approval (as well as any additional rate limiting as described in operation 1050 below). Operation 1040 also, or alternatively, may consider a variety of factors associated with the user, such as, for example, the user's messaging rate, the user's behavior in the messaging system, and the size of the message.

The system applies a rate limiting algorithm (1050), and, if the message was approved, sends the message (1060). Rate limiting (1050) may be applied optionally, such as, for example, by only applying rate limiting if the message is approved for sending.

The system then determines if there is a message-send request waiting for a determination of whether the associated message will be approved (1070). If there is a message-send request waiting, then process 1000 loops back to operation 1040 to determine whether to approve the message associated with the waiting message-send request (1070, "Y" branch). If there are no message-send requests waiting, then process 1000 may loop back to operation 1030 to be in a position to receive any future message-send requests from the user (1070, "N" branch). Note that process 1000 also may receive message-send requests while processing a single message-send request in operations 1040 through 1070.

Many of the above implementations may be modified, as indicated in process 1000, so that tickets are not required. For example, systems 500 and 700 may use the described mutual exclusion locking techniques to process message-send requests without using tickets. In such implementations, all message-send requests from a given user may be serialized. For example, an implementation may require a user-token to be locked before a user's message-send request can be processed. Separate threads will need to wait until the token is released before those threads can process a message-send request for the user and the token may be released, for example, after sending the message to the intended recipient(s). Such implementations may, for example, send all messages to the intended recipient(s) and merely introduce delay from the serialization. Implementations also may prevent messages from being sent by, for example, limiting the number of threads that will be allowed to wait for a user's token and canceling all message-send requests beyond the limit.

Figure 11:
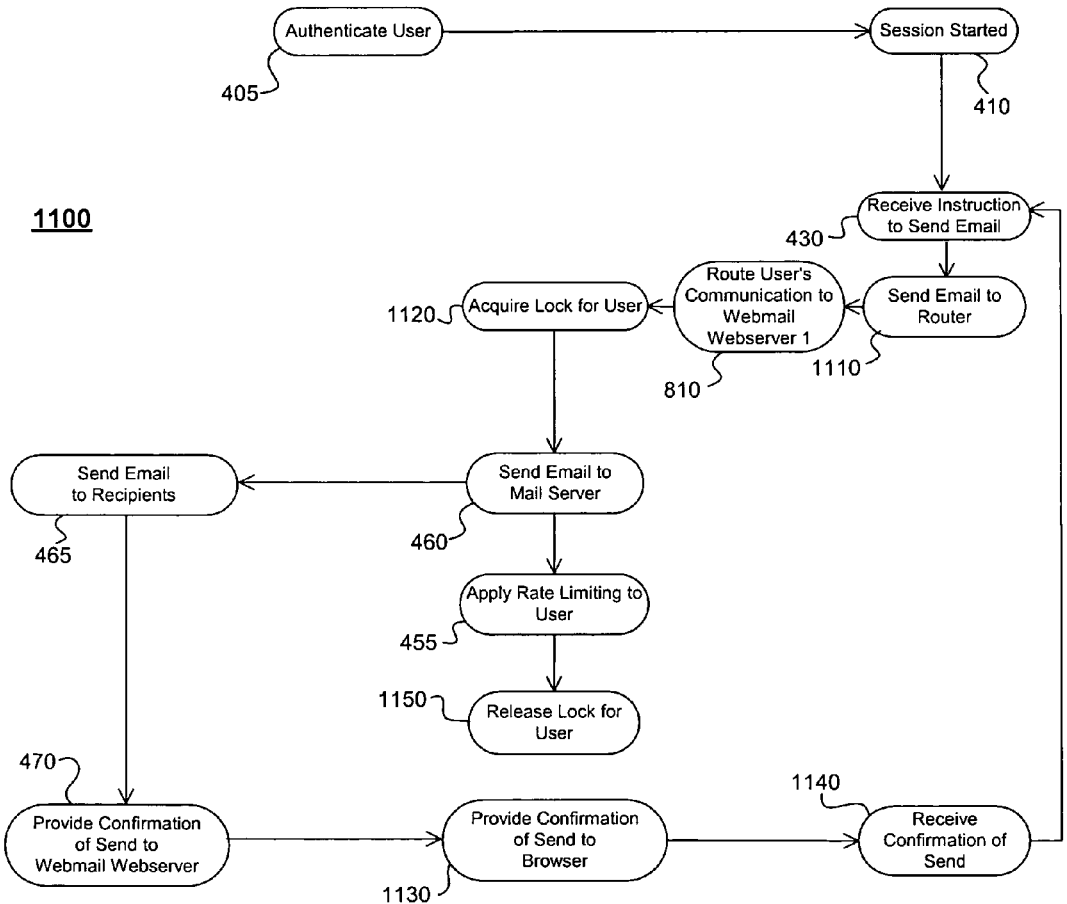
FIG. 11 is a flow chart of another serialization process that may be used with, for example, the system of FIG. 7.

Referring to FIG. 11, a process 1100 is shown that does not use tickets. Process 1100 may be used to restrict the volume of outgoing electronic messages, such as, for example, electronic mail, from a given user. Process 1100 may be implemented on a variety of systems and architectures, but for clarity of presentation is described below in the context of system 700. As described below, much of process 1100 is similar to process 800, and, accordingly, common operations are not described in detail.

Process 1100 includes authentication webserver 350 authenticating a user (405). After the user is authenticated (405), the user may use browser 310 to start an email session (410). Browser 310 may receive an instruction to send an email message (430). Browser 310 then sends to router 710 a message-send request that includes the email message (1110), and router 710 routes the message-send request to webmail webserver 720*a* (810).

Webmail webserver 720*a* then acquires a lock for the user (1120) to serialize the sending of email messages for the user, and then sends the email message to mail server 380 (460). Webmail webserver 720*a* may acquire a lock by, for example, setting a flag. In another implementation, webmail webserver 720*a* acquires a lock as part of operation 460 by locking a resource that is used in sending the email message for the user.

After receiving the email message from webmail webserver 720*a*, mail server 380 sends the email message to the intended recipient(s) (465) and provides a confirmation to webmail webserver 720*a* that the email message was sent (470). Webmail webserver 720*a* provides the received confirmation to browser 310 (1130). Browser 310 receives the confirmation (1140) and, in one implementation, is ready to receive an instruction to send another email message (430).

After sending the email message to mail server 380 (460), webmail webserver 720*a* applies a rate limiting algorithm to the user (455), and then releases the lock that was acquired for the user in operation 1120 (1150).

As discussed, process 1100 releases the lock (1150) after applying rate limiting to the user (455). Processes 600 and 800, in contrast, wait until after a ticket has been updated (655). Processes 600 and 800 may be modified, however, to release the lock earlier. For example, process 600 may be modified so that ticket server 510 performs the rate limiting of operation 455 and then releases the lock before updating the ticket (655). By performing the rate limiting of operation 455 at ticket server 510 (rather than at webmail webserver 520*a*), message-send requests for the user from other webmail webservers are not evaluated by ticket server 510 until the rate limiting algorithm allows.

In a system that implements the above modification of releasing the lock (665) before updating the ticket (655), the system also may invalidate the ticket so that the ticket cannot be used again in the period of time between releasing the lock (665) and updating the ticket (655). The system also may acquire a lock prior to updating the ticket (655), and hold the lock until after sending the ticket to webmail webserver 520*a* (660) so as to ensure that the updated ticket is not modified prior to being sent to webmail webserver 520*a* (660). Locks may be acquired, to protect tickets or other features, at various other points in a process, such as, for example, ticket generation (610).

In other implementations, mail server 380 may perform ticket verification/generation. For example, in system 300 webmail webserver 360 may send all messages to mail server 380 in a standard manner and mail server 380 may perform the ticket verification and generation. Mail server 380 also, or alternatively, may perform mutual exclusion locking such as that performed, for example, by ticket server 510 in system 500 and by webmail webservers 720*a* and 720*b* in system 700. Other implementations may use multiple mail servers, and a router may be disposed between the webmail webservers and multiple mail servers to map each user to a particular mail server that provides, for example, mutual exclusion locking and ticket verification/generation for users mapped to that mail server. Such implementations that modify the mail server and use the mail server to provide part of the serialization would not be performing the serialization entirely at the web-level. In contrast, implementations of systems 300 and 700 may perform serialization entirely at the web-level.

Evaluating a message-send request, for example, may include evaluating a user ID associated with the request, a message associated with the request, a ticket associated with the request, or some other data associated with the request. Evaluating data may include, for example, verifying that the data has a proper format, comparing the data against a table or list, verifying that the data is present, verifying that the data was received accurately, or performing an operation on the data.

Many of the implementations are discussed with reference to electronic messages from a given user. The implementations may be applied more generally to electronic messages from a given entity. The entity may include more than a single user or account, such as, for example, by having the entity include a list of users from a given organization. The entity need not be identified with users, per se, such as, for example, by having the entity refer to a computer, or perhaps a set of computers from, for example, a university or a corporation. In a manner analogous to associating a user with a "user ID," entities may be associated with an "entity ID."

Many of the implementations are discussed with reference to web-based messaging. The implementations also may be applied to client-based messaging, such as, for example, email systems in which the interface to a mail server is resident on a user's computer rather than on a host computer. As an example, ticket-based implementations may be used with a client-based messaging system if, for example, (i) the user's computer has the ability to receive and replay session context data sent by a server (for example, a "cookie-like" capacity), and (ii) a server system may be configured to implement, in coordination with the mail server, one of ticketing techniques discussed.

As another example, implementations that do not use tickets, such as, for example, process 1100, also may be used with a client-based messaging system. Such implementations may be implemented as server-side implementations and, accordingly, may be implemented independently of the user's computer. For example, a mail server system may be configured to direct a given entity's requests to the same server, at which the requests are serialized.

Various of the implementations discussed above may be modified to include a memory of users that have had a ticket from a message-send request declared invalid. Such a memory may be used, for example, to purge pending message-send requests from a user that has just had a ticket declared invalid. The purge may be conditioned on various other, or additional, criteria. For example, the purge may be conditioned on a system not having yet sent a new ticket to the user, so that the system knows that the pending message-send requests for that user include invalid tickets. As another example, the purge may be conditioned on the user having had a predetermined threshold number of tickets declared invalid in a given time period.

The techniques described above may be used with various types of systems for transferring information including, for example, electronic mail systems, instant messaging systems, and file transfer systems. Such systems may communicate over a variety of different networks, including, for example, the web, the Intranet, local area networks, wide area networks, wireless networks, wired networks, private networks, and public networks.

Various of the implementations described above, including the processes and the systems, may be implemented using one or more processors operating individually or collectively. A processor may include, for example, a computer processing unit ("CPU") or other device capable of executing instructions. Instructions may be in the format of, for example, software or firmware, and instructions may be stored in a computer readable medium. A computer readable medium may include, for example, a disk (such as, for example, a hard disk, a floppy disk, or a compact disk), a random-access memory, or a read-only memory. Such media may be distributed across different components or systems, even in different locations, and may contain different but cooperating instructions for collectively performing a desired process using the different components or systems.

A number of implementations have been described. Nevertheless, various modifications may be made. For example, the elements and operations of the systems and processes described may be omitted, varied, rearranged, supplemented, and interchanged to accommodate different applications and environments. Accordingly, other implementations are within the scope of the following claims.

What is claimed is:

1. A method of approving an electronic message for sending, the method comprising:
    logging a client into a communication system configured to be used by a client to generate and send electronic messages;
    generating, at the communication system, a ticket that is configured to be used a limited number of times by the client when sending electronic messages;
    storing, at the communication system, an indication of the ticket;
    providing the ticket to the client;
    receiving, at the communication system, a request from the client to send an electronic message, the request being associated with the ticket and an electronic message composed at the client after the client receives the ticket;
    accessing, at the communication system, the indication of the ticket;
    determining, at the communication system and based on the accessed indication of the ticket, whether the ticket has already been used by the client the limited number of times when sending electronic messages;
    sending the electronic message from the communication system if the determination indicates that the ticket has not been used by the client the limited number of times; and
    preventing the electronic message from being sent from the communication system if the determination indicates that the ticket has been used by the client the limited number of times
    wherein the request from the client to send an electronic message is a request to send the electronic message to a recipient, and
    wherein sending the electronic message from the communication system includes sending the electronic message without the ticket to a second communication system associated with the recipient.

2. The method of claim 1 wherein preventing the electronic message from being sent from the communication system includes preventing the electronic message from being sent over the Internet from the communication system to a second communication system.

3. The method of claim 2 further comprising:
    receiving the electronic message without the ticket at the second communication system associated with the recipient; and
    delivering, from the second communication system associated with the recipient, the electronic message without the ticket to the recipient.

4. The method of claim 1 further comprising storing a time stamp of an electronic message that was most recently sent for the client, wherein:
    generating the ticket comprises including the time stamp as the time stamp is stored when the ticket is generated; and
    determining whether the ticket has already been used by the client the limited number of times when sending electronic messages comprises comparing the time stamp associated with the ticket to the time stamp as it is stored.

5. The method of claim 1 wherein:
    the ticket allows the client to send only one electronic message; and
    determining whether the ticket has already been used by the client the limited number of times when sending electronic messages comprises determining whether the ticket has been used by the client one time.

6. The method of claim 1 further comprising:
    receiving, at the communication system, a second request from the client to send a second electronic message, the second request being associated with a second ticket and the second electronic message;
    determining, after receiving the second request, whether the second ticket is a ticket that has already been used by the client the limited number of times when sending electronic messages; and
    sending the second electronic message from the communication system if the determination indicates that the second ticket has not been used by the client the limited number of times
    wherein the second request is received before determining whether the ticket has already been used by the client the limited number of times when sending electronic messages, and determining whether the ticket has already been used by the client the limited number of times when sending electronic messages and determining whether the second ticket is a ticket that has already been used by the client the limited number of times when sending electronic messages are performed serially.

7. The method of claim 6 wherein performing the determinations serially comprises locking a resource while determining whether the ticket has already been used by the client the limited number of times when sending electronic messages and while determining whether the second ticket is a ticket that has already been used by the client the limited number of times when sending electronic messages.

8. The method of claim 6 wherein:
    receiving the request comprises receiving the request over a first session; and
    receiving the second request comprises receiving the second request over a second session, the second session being active concurrently with the first session.

9. The method of claim 6 wherein:
    the first request and the second request are received at a web-based server;
    the sending of the electronic message from the communication system is performed at the web-based server; and
    the sending of the second electronic message from the communication system is performed at the web-based server.

10. The method of claim 6 further comprising waiting to determine whether the second ticket is a ticket that has already been used by the client the limited number of times when sending electronic messages until after determining whether the ticket has already been used by the client the limited number of times when sending electronic messages.

11. The method of claim 6 wherein determining serially whether the ticket and the second ticket have already been used by the client the limited number of times when sending electronic messages results in restricting an outbound volume of electronic messages for the client.

12. The method of claim 1 wherein determining whether the ticket has already been used by the client the limited number of times when sending electronic messages comprises determining that the ticket has already been used by the client the limited number of times when sending electronic messages, and the method further comprises declining to approve for sending at least one additional electronic message from the client based on determining that the ticket has already been used by the client the limited number of times when sending electronic messages, the additional electronic message being associated with an additional request.

13. The method of claim 1 further comprising:
   receiving the first request at a router within the communication system;
   receiving a second request at the router from the client, the second request being to send a second electronic message and being associated with a second ticket;
   determining, at the router, a common server that is mapped to the client and within the communication system the common server being in communication with the router;
   sending the first request and the second request to the common server; and
   determining at the common server whether the second ticket has already been used by the client the limited number of times when sending electronic messages.

14. The method of claim 1 wherein the client comprises multiple users.

15. The method of claim 1 wherein the client comprises multiple computers.

16. The method of claim 1 further comprising applying a rate-limiting algorithm in reference to the client before sending the electronic message.

17. The method of claim 1 further comprising waiting at least a predetermined period of time after sending a previous electronic message for the client before sending the electronic message.

18. The method of claim 17 wherein:
   the ticket includes an indicator of when the previous electronic message was sent, and
   waiting at least the predetermined period of time comprises using the indicator to determine whether the predetermined period of time has elapsed.

19. The method of claim 1 further comprising waiting at least a predetermined period of time after sending the electronic message before issuing a second ticket to the client.

20. A method of approving an electronic message for sending, the method comprising:
   logging a client into a communication system configured to be used by a client to generate and send electronic messages;
   steps for generating, at the communication system, a ticket that is configured to be used a limited number of times by the client when sending electronic messages;
   storing, at the communication system, an indication of the ticket;
   providing the ticket to the client;
   receiving, at the communication system, a request from the client to send an electronic message, the request being associated with the ticket and an electronic message composed at the client after the client receives the ticket;
   accessing, at the communication system, the indication of the ticket;
   steps for determining, at the communication system and based on the accessed indication of the ticket, whether the ticket has already been used by the client the limited number of times when sending electronic messages;
   sending the electronic message from the communication system if the determination indicates that the ticket has not been used by the client the limited number of times; and
   preventing the electronic message from being sent from the communication system if the determination indicates that the ticket has been used by the client the limited number of times
   wherein the request from the client to send an electronic message is a request to send the electronic message to a recipient, and
   wherein sending the electronic message from the communication system includes sending the electronic message without the ticket to a second communication system associated with the recipient.

21. A computer-readable medium encoded with a computer program comprising instructions that, when executed, operate to cause a communication system to perform operations comprising:
   logging a client into the communication system, wherein the communication system is configured to be used by a client to generate and send electronic messages;
   generating, at the communication system, a ticket that is configured to be used a limited number of times by the client when sending electronic messages;
   storing, at the communication system, an indication of the ticket;
   providing the ticket to the client;
   receiving, at the communication system, a request from the client to send an electronic message, the request being associated with the ticket and an electronic message composed at the client after the client receives the ticket;
   accessing, at the communication system, the indication of the ticket;
   determining, at the communication system and based on the accessed indication of the ticket, whether the ticket has already been used by the client the limited number of times when sending electronic messages;
   sending the electronic message from the communication system if the determination indicates that the ticket has not been used by the client the limited number of times; and
   preventing the electronic message from being sent from the communication system if the determination indicates that the ticket has been used by the client the limited number of times
   wherein the request from the client to send an electronic message is a request to send the electronic message to a recipient, and
   wherein sending the electronic message from the communication system includes sending the electronic message without the ticket to a second communication system associated with the recipient.

22. The computer-readable medium of claim 21 wherein preventing the electronic message from being sent from the communication system includes preventing the electronic message from being sent over the Internet from the communication system to a second communication system.

23. The computer-readable medium of claim 21 wherein the operations further comprise:
receiving the electronic message without the ticket at the second communication system associated with the recipient; and
delivering, from the second communication system associated with the recipient, the electronic message without the ticket to the recipient.

24. The computer-readable medium of claim 21 wherein the operations further comprise storing a time stamp of an electronic message that was most recently sent for the client, wherein:
generating the ticket comprises including the time stamp as the time stamp is stored when the ticket is generated; and
determining whether the ticket has already been used by the client the limited number of times when sending electronic messages comprises comparing the time stamp associated with the ticket to the time stamp as it is stored.

25. The computer-readable medium of claim 21 wherein:
the ticket allows the client to send only one electronic message; and
determining whether the ticket has already been used by the client the limited number of times when sending electronic messages comprises determining whether the ticket has been used by the client one time.

26. The computer-readable medium of claim 21 further comprising:
receiving, at the communication system, a second request from the client to send a second electronic message, the second request being associated with a second ticket and the second electronic message;
determining, after receiving the second request, whether the second ticket is a ticket that has already been used by the client the limited number of times when sending electronic messages; and
sending the second electronic message from the communication system if the determination indicates that the second ticket has not been used by the client the limited number of times wherein the second request is received before determining whether the ticket has already been used by the client the limited number of times when sending electronic messages, and determining whether the ticket has already been used by the client the limited number of times when sending electronic messages and determining whether the second ticket is a ticket that has already been used by the client the limited number of times when sending electronic messages are performed serially.

27. The computer-readable medium of claim 26 wherein performing the determinations serially comprises locking a resource while determining whether the ticket has already been used by the client the limited number of times when sending electronic messages and while determining whether the second ticket is a ticket that has already been used by the client the limited number of times when sending electronic messages.

28. The computer-readable medium of claim 26 wherein:
the first request and the second request are received at a web-based server;
the sending of the electronic message from the communication system is performed at the web-based server; and
the sending of the second electronic message from the communication system is performed at the web-based server.

29. The computer-readable medium of claim 26 further comprising waiting to determine whether the second ticket is a ticket that has already been used by the client the limited number of times when sending electronic messages until after determining whether the ticket has already been used by the client the limited number of times when sending electronic messages.

30. The computer-readable medium of claim 21 wherein determining whether the ticket has already been used by the client the limited number of times when sending electronic messages comprises determining that the ticket has already been used by the client the limited number of times when sending electronic messages, and the medium further comprises declining to approve for sending at least one additional electronic message from the client based on determining that the ticket has already been used by the client the limited number of times when sending electronic messages, the additional electronic message being associated with an additional request.

31. The computer-readable medium of claim 21 further comprising:
receiving the first request at a router within the communication system;
receiving a second request at the router from the client, the second request being to send a second electronic message and being associated with a second ticket;
determining, at the router, a common server that is mapped to the client and within the communication system the common server being in communication with the router;
sending the first request and the second request to the common server; and
determining at the common server whether the second ticket has already been used by the client the limited number of times when sending electronic messages.

32. The computer-readable medium of claim 31 wherein:
the ticket includes an indicator of when the previous electronic message was sent, and
waiting at least a predetermined period of time comprises using the indicator to determine whether the predetermined period of time has elapsed.

33. The computer-readable medium of claim 21 further comprising waiting at least a predetermined period of time after sending the electronic message before issuing a second ticket to the client.

* * * * *